Figure 1:
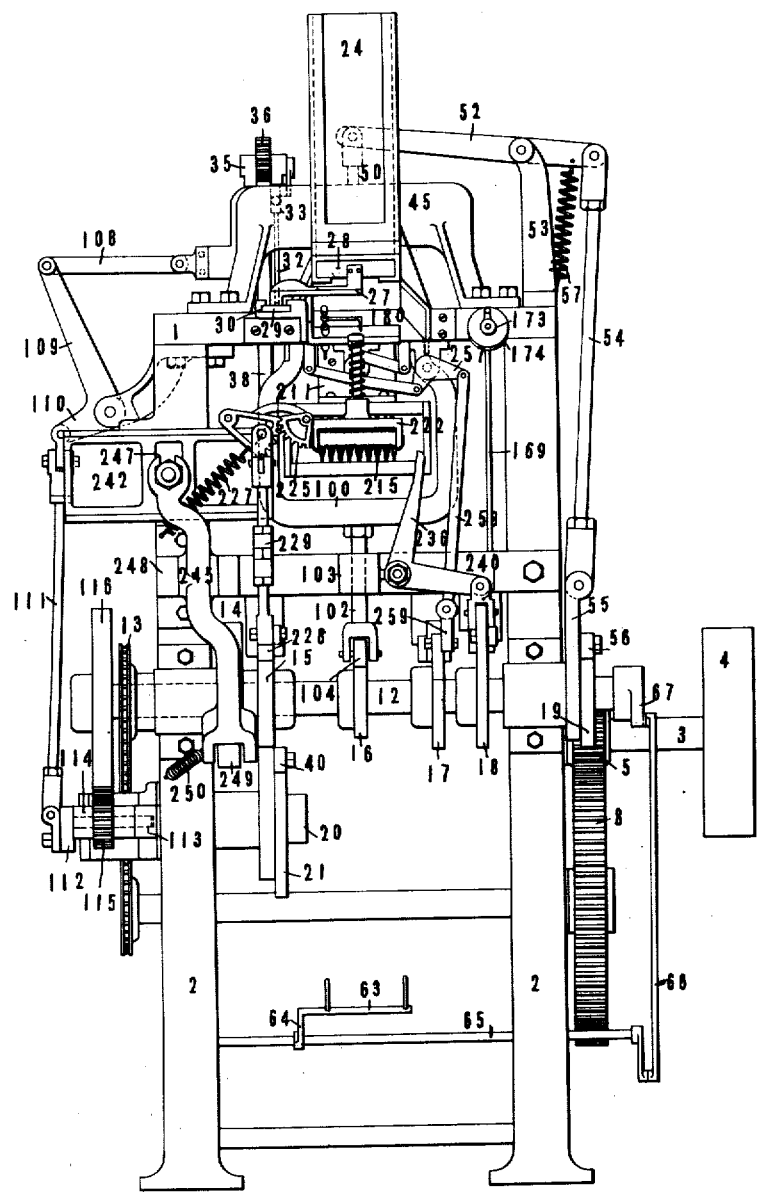

R. BURT.
LABELING MACHINE.
APPLICATION FILED MAY 1, 1912.

1,174,670.

Patented Mar. 7, 1916.
13 SHEETS—SHEET 1.

WITNESSES

INVENTOR
R. Burt
BY
ATTORNEYS

R. BURT.
LABELING MACHINE.
APPLICATION FILED MAY 1, 1912.

1,174,670.

Patented Mar. 7, 1916.
13 SHEETS—SHEET 3.

WITNESSES

INVENTOR
R. Burt
BY
Dull, Warfield & Duell
ATTORNEYS

R. BURT.
LABELING MACHINE.
APPLICATION FILED MAY 1, 1912.

1,174,670.

Patented Mar. 7, 1916.
13 SHEETS—SHEET 5.

WITNESSES

INVENTOR
R. Burt
BY
Duell, Warfield & Duell
ATTORNEYS

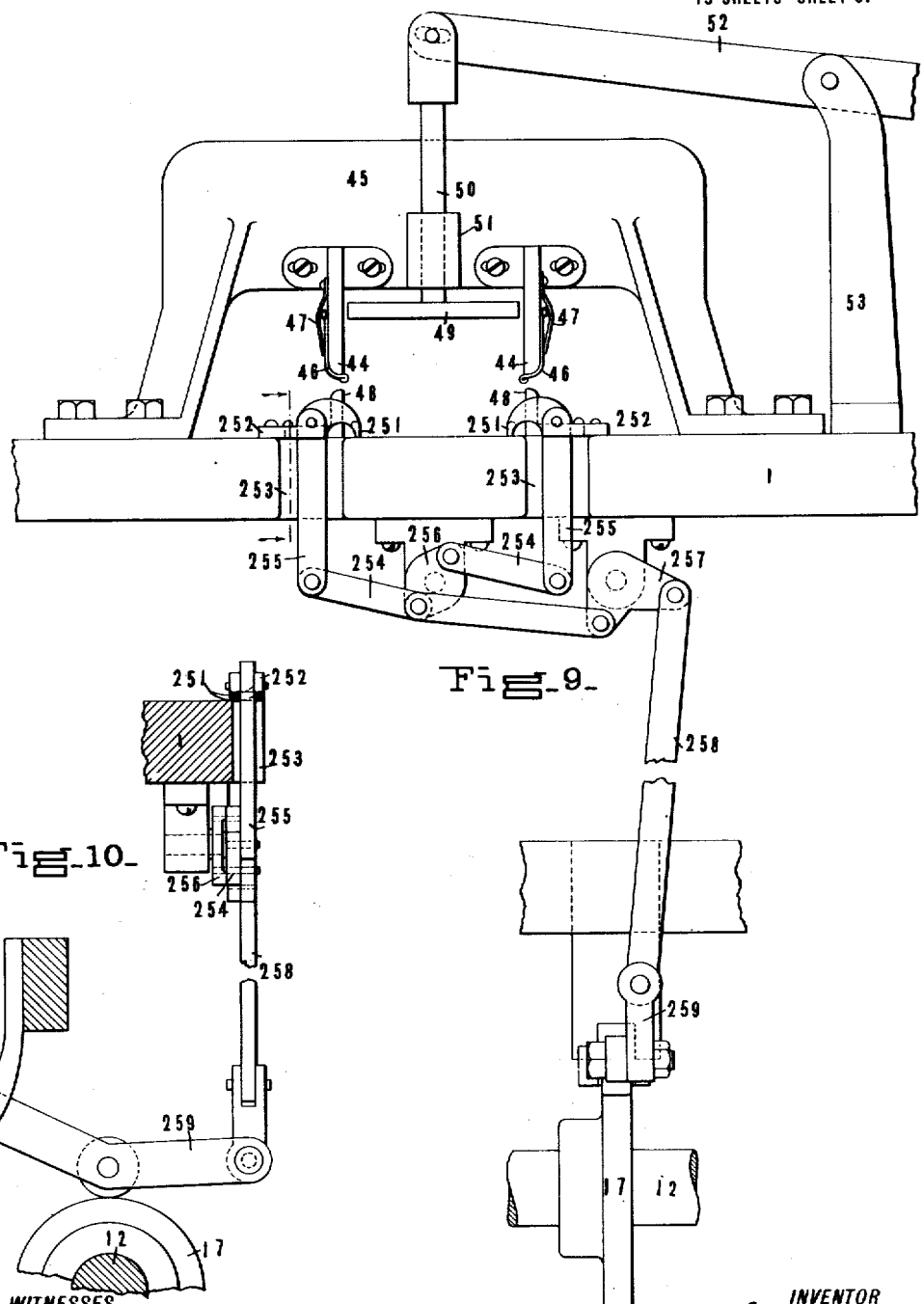

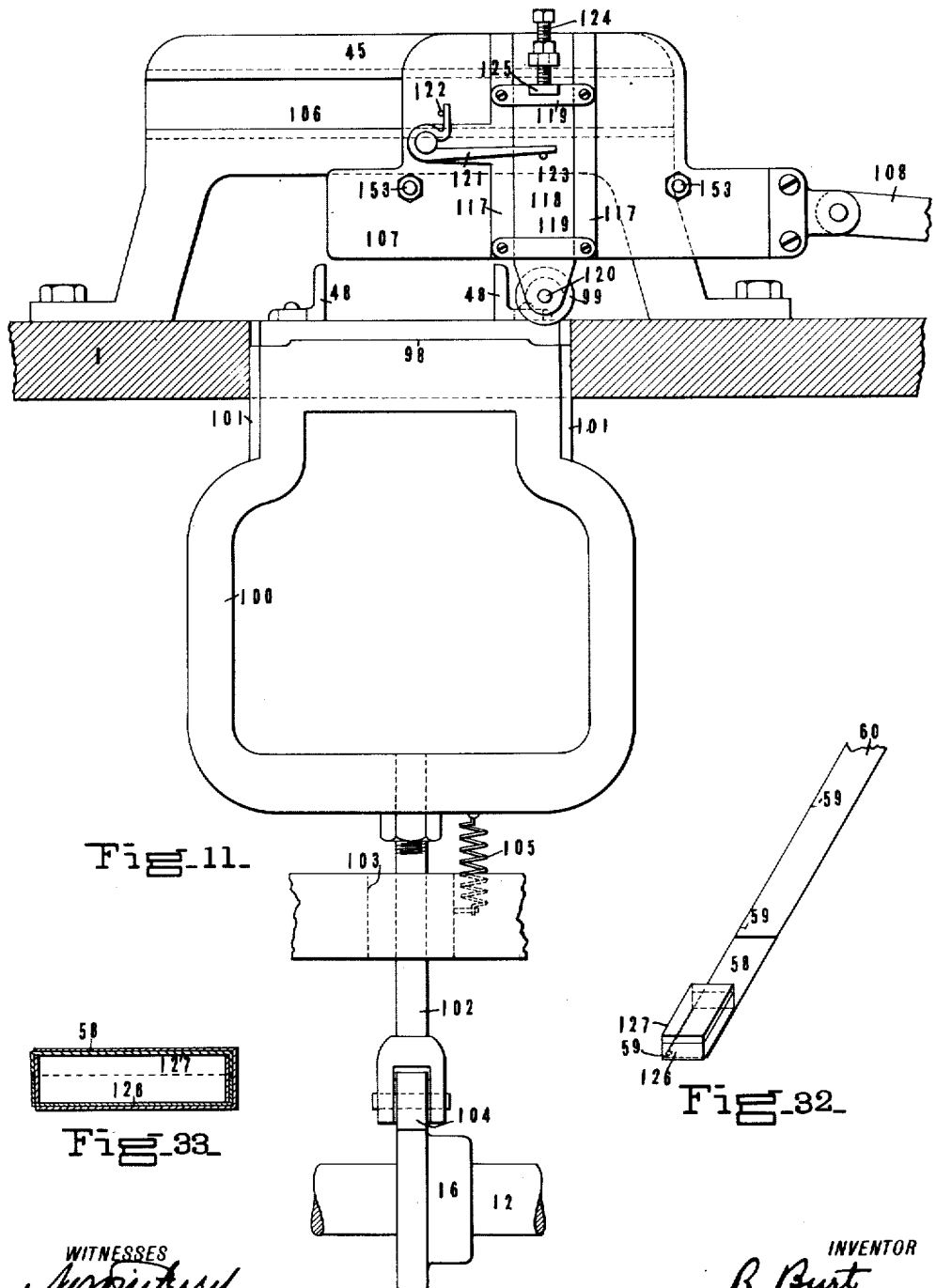

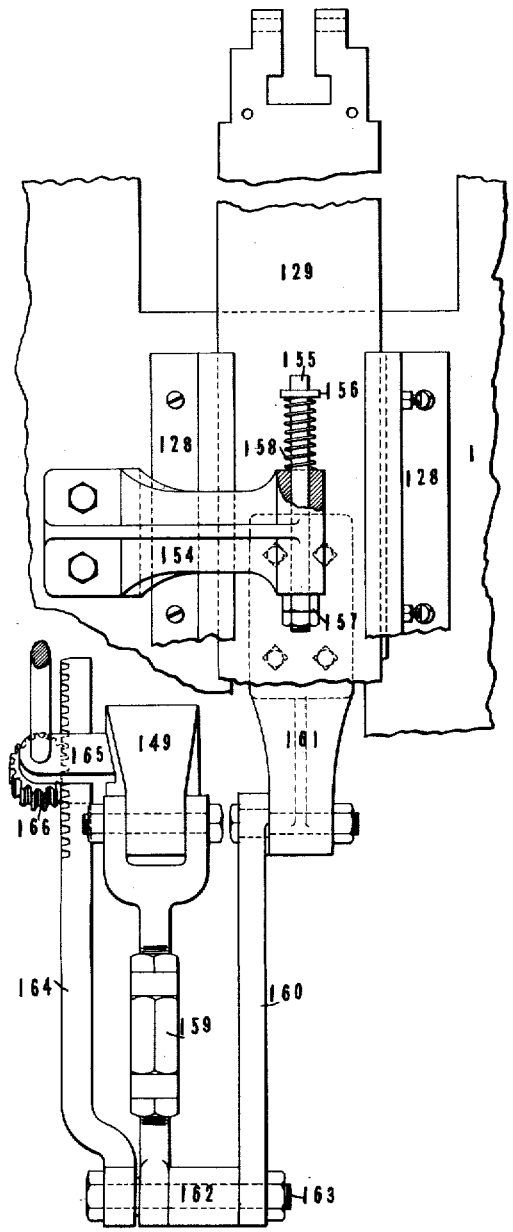
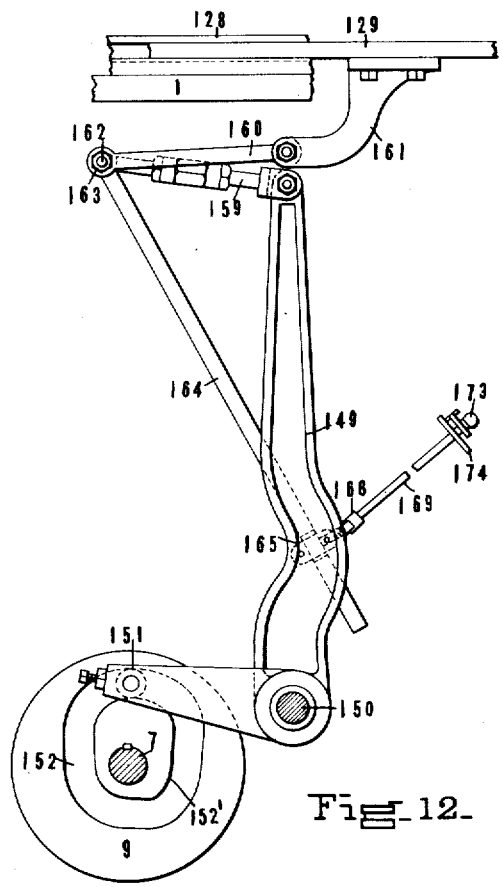

R. BURT.
LABELING MACHINE.
APPLICATION FILED MAY 1, 1912.
1,174,670. Patented Mar. 7, 1916.
13 SHEETS—SHEET 9.
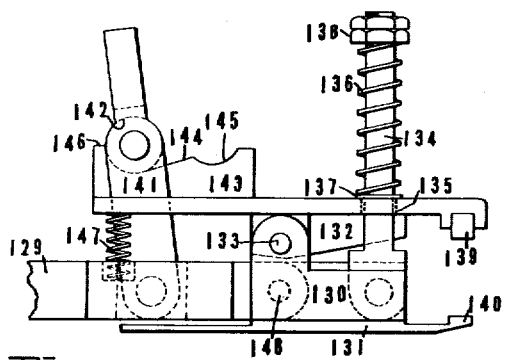
Fig. 18.
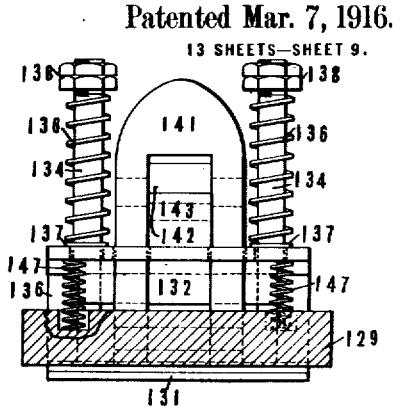
Fig. 19.
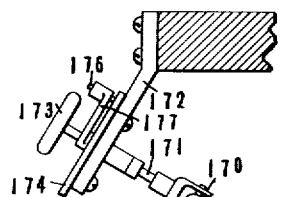
Fig. 14.
Fig. 15.
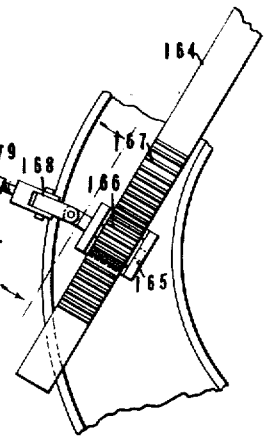
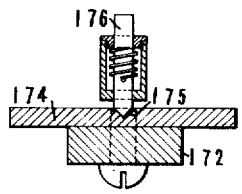
Fig. 16.
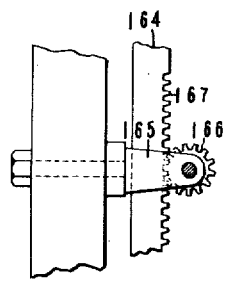
Fig. 17.
WITNESSES
INVENTOR
R. Burt
BY
Duell, Warfield & Duell
ATTORNEYS

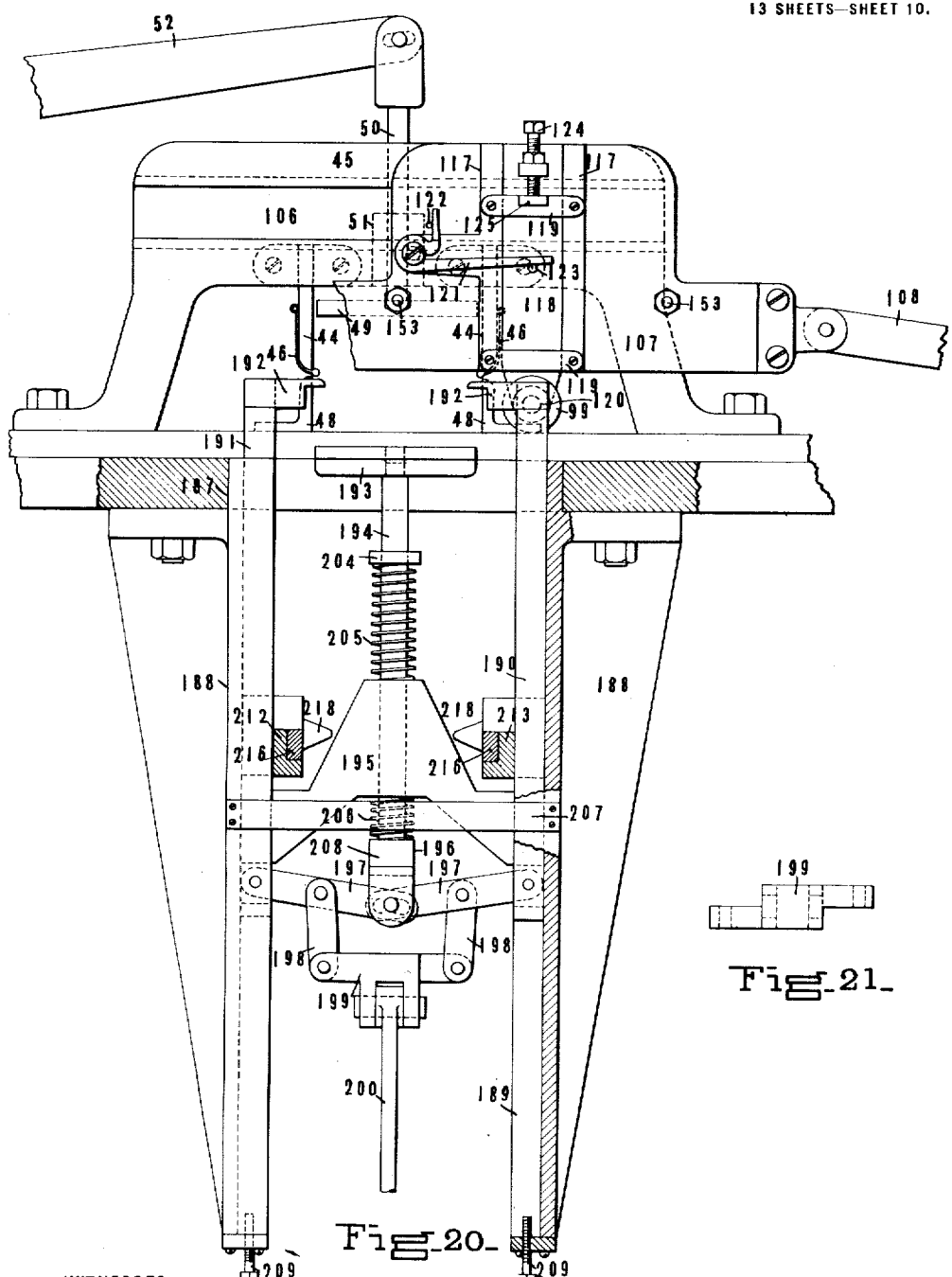

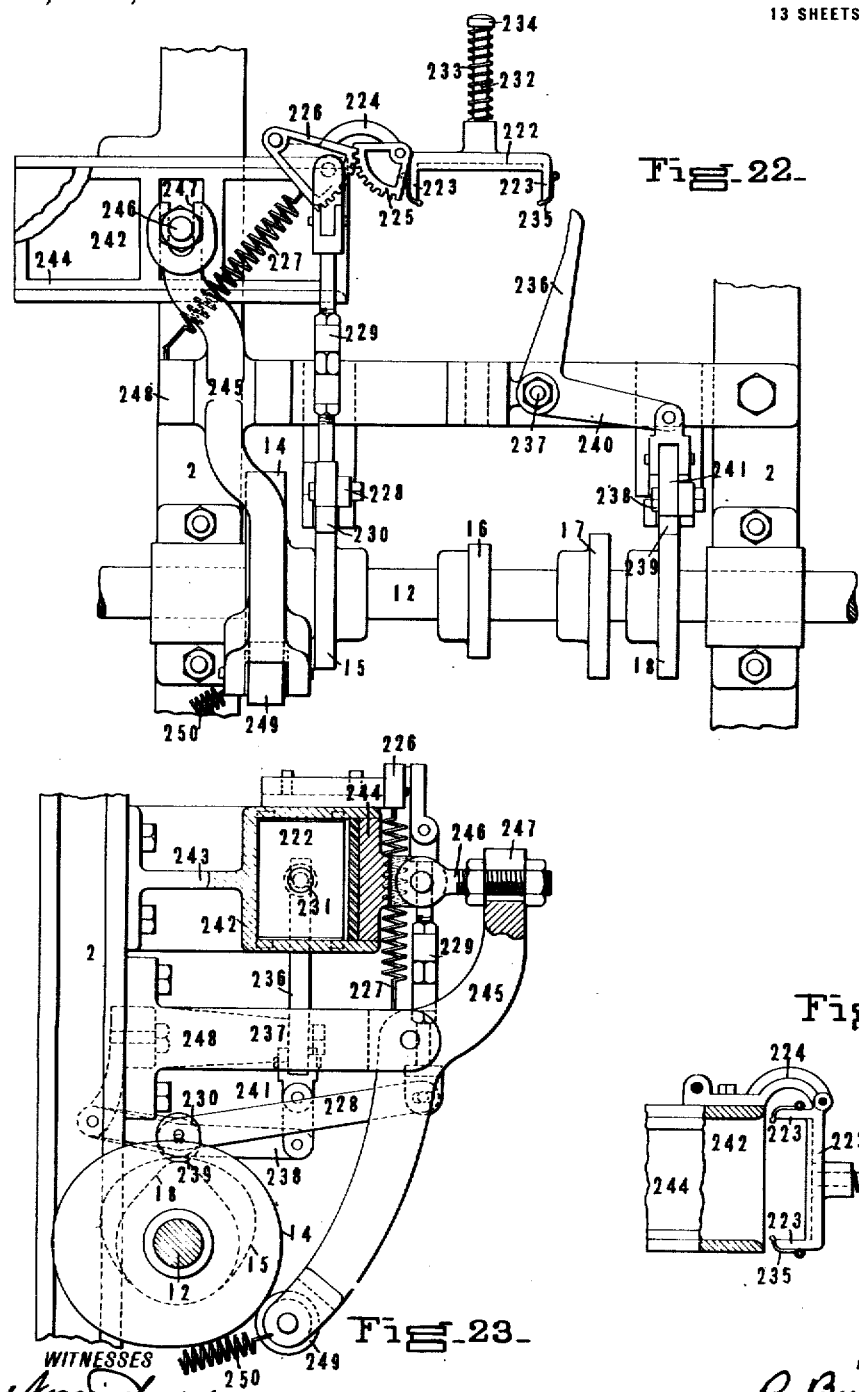

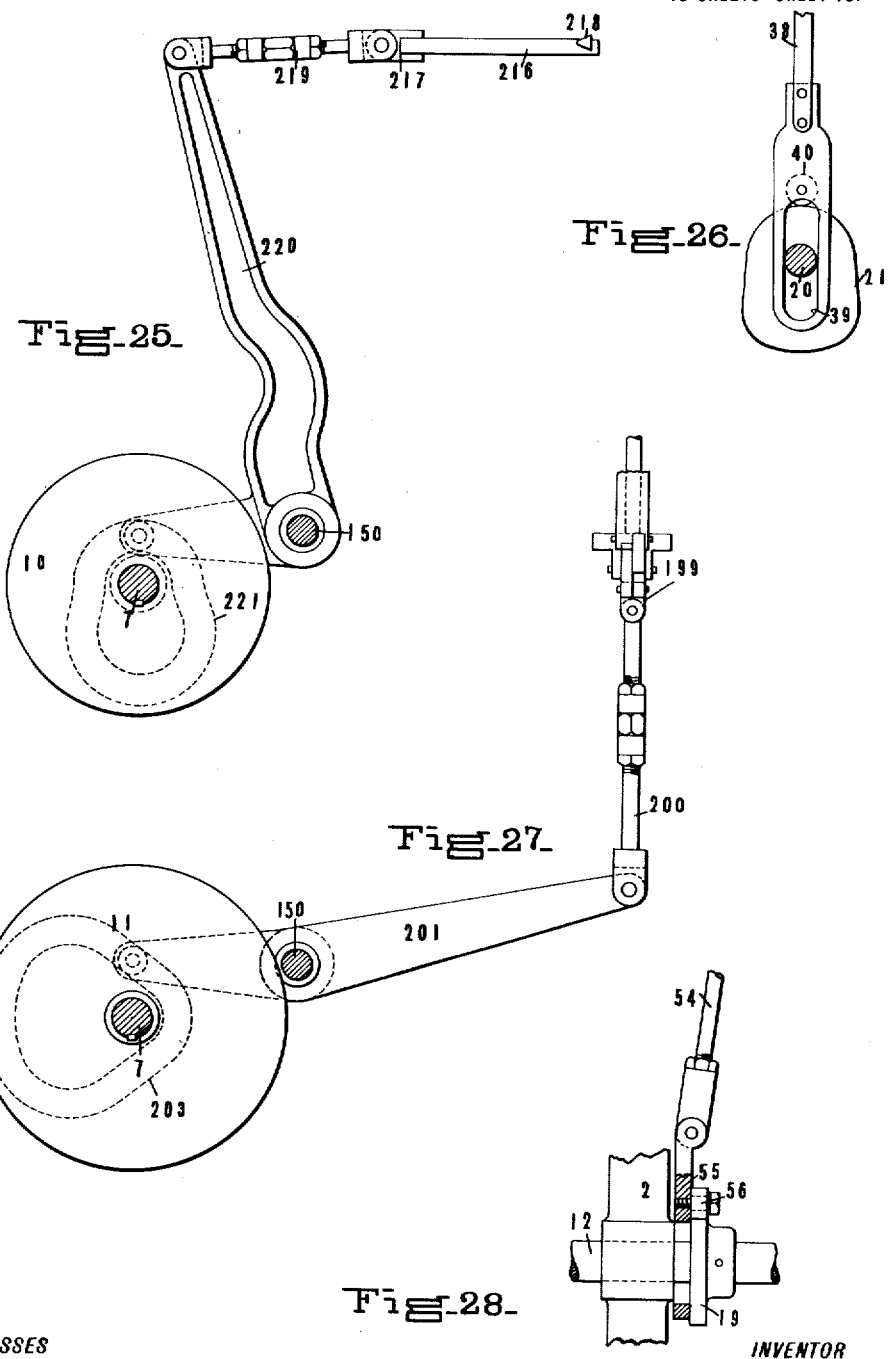

R. BURT.
LABELING MACHINE.
APPLICATION FILED MAY 1, 1912.

1,174,670.

Patented Mar. 7, 1916.
13 SHEETS—SHEET 13.

WITNESSES

INVENTOR
R. Burt
BY
Duell, Warfield & Duell
ATTORNEYS

UNITED STATES PATENT OFFICE.

ROBINSON BURT, OF BUFFALO, NEW YORK, ASSIGNOR TO F. N. BURT COMPANY LIMITED, OF BUFFALO, NEW YORK, A CORPORATION OF ONTARIO, CANADA.

LABELING-MACHINE.

1,174,670.  Specification of Letters Patent.  Patented Mar. 7, 1916.

Application filed May 1, 1912. Serial No. 694,361.

*To all whom it may concern:*

Be it known that I, ROBINSON BURT, a citizen of the United States, residing at Buffalo, in the county of Erie and State of New York, have invented certain new and useful Improvements in Labeling-Machines, of which the following is a full, clear, and exact description, such as will enable others skilled in the art to which it appertains to make and use the same.

This invention relates to labeling machines, and with respect to its more specific features, to machines whereby a strip of flexible material, such as paper, cloth, etc., may be applied and secured to separable elements, such as the container and cover of a box, thereby connecting and hinging said elements together, the hinge strip offering a means of covering portions of the boxes and displaying printed notices, etc.

One of the objects of the invention is the provision of a practical machine for applying and affixing hinges of flexible material to paper boxes.

Another object is the provision of a simple machine of the character described in which the hinges are produced from a continuous web of material and automatically affixed to a container and cover across the joint therebetween.

Another object of the invention is the production of an efficient machine for affixing to boxes labels marked, as by printing, and providing mechanism whereby different parts of the label, as for instance the marked part, may be affixed to a predetermined portion of the box.

Another object of the invention is the provision of a practical machine for severing marked labels from a marked continuous web and successively applying them to a series of boxes in predetermined position.

Another object is the provision of an efficient machine for labeling boxes from a continuous web of material, embodying mechanism for controlling and setting the web-feeding mechanism.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 2:
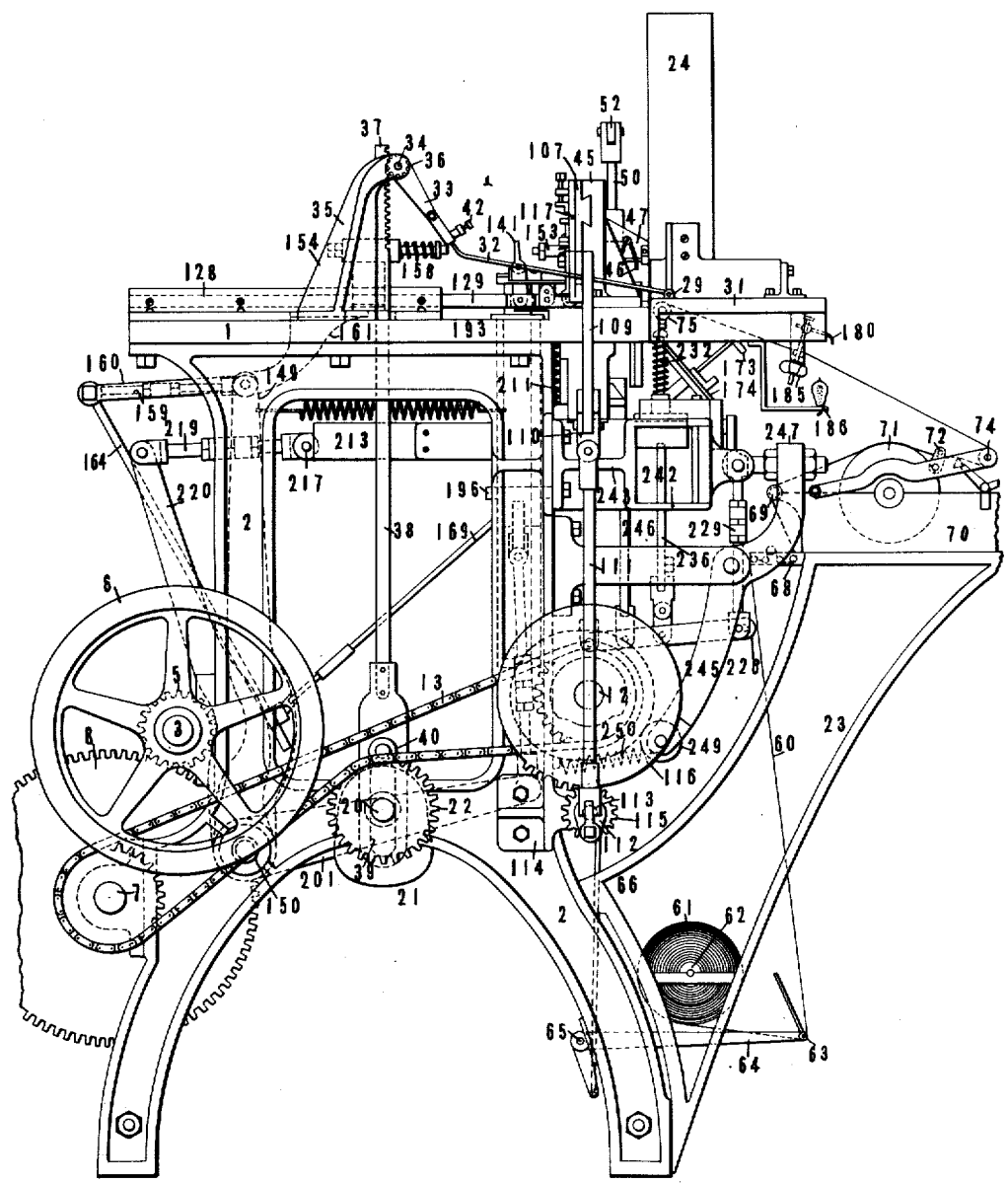
Figure 3:
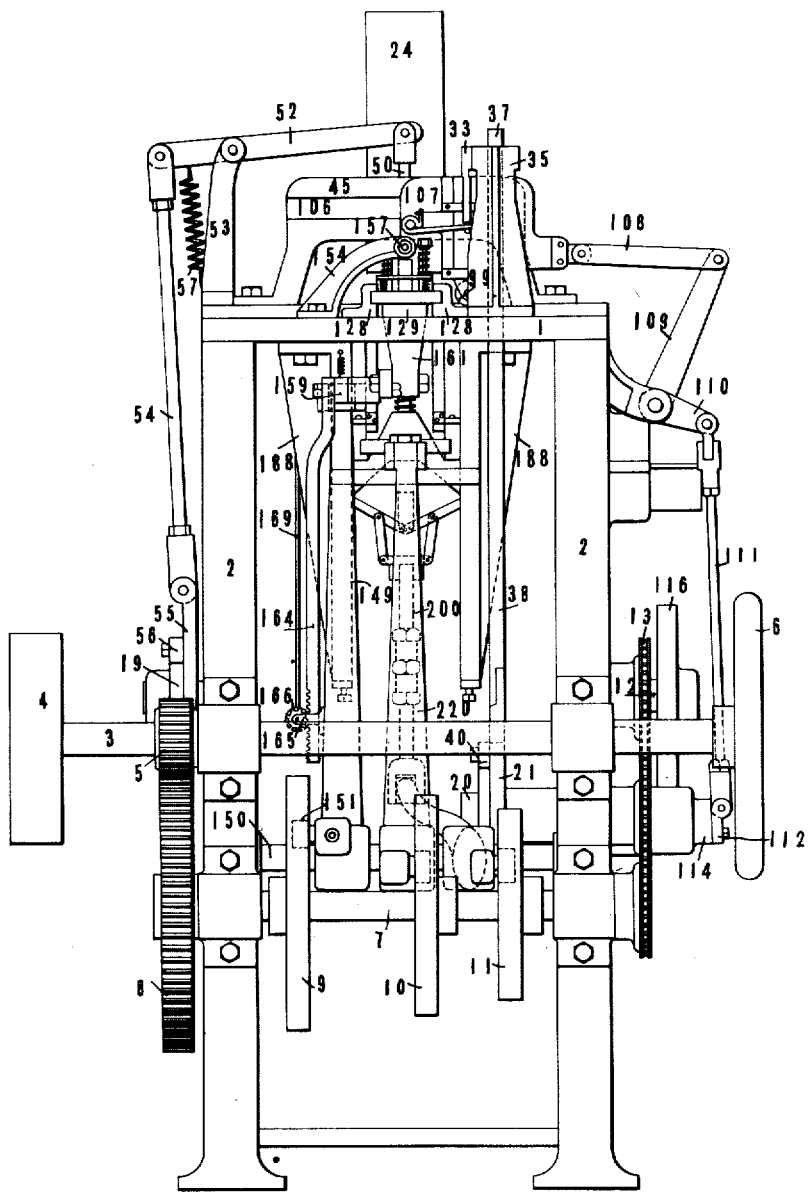
Figure 4:
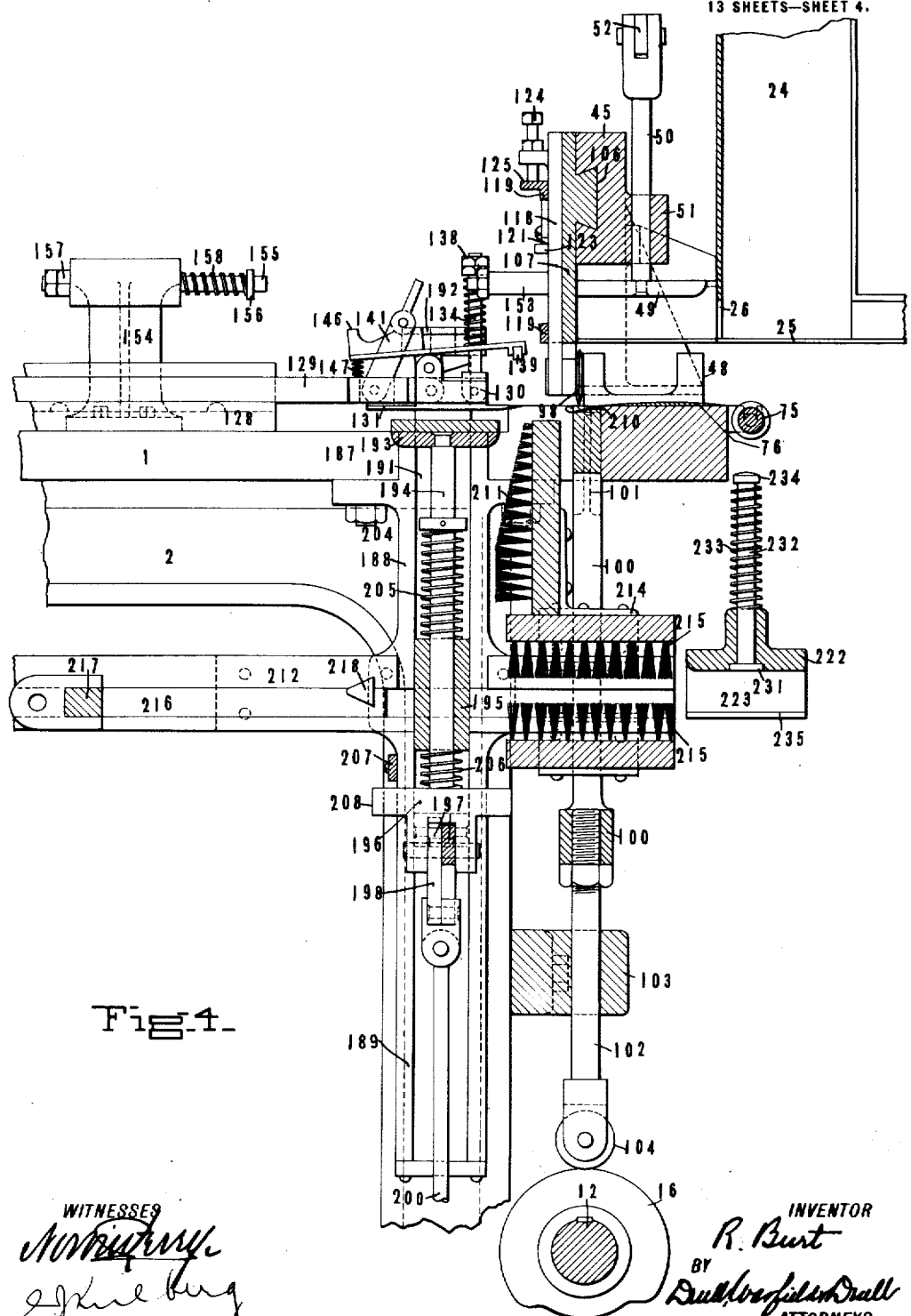
Figure 5:
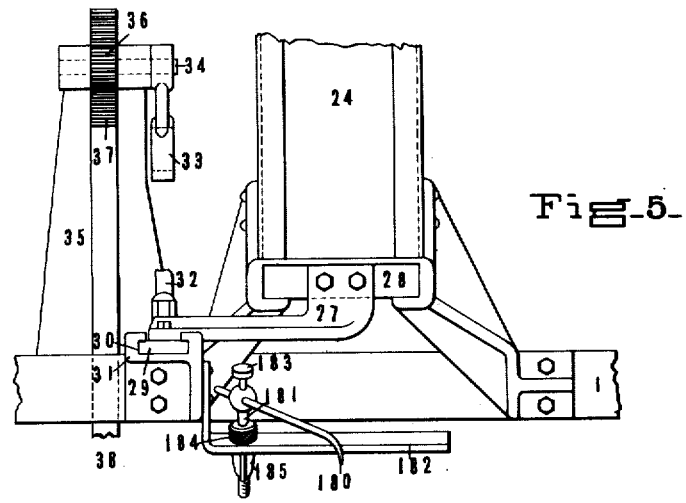
Figure 6:
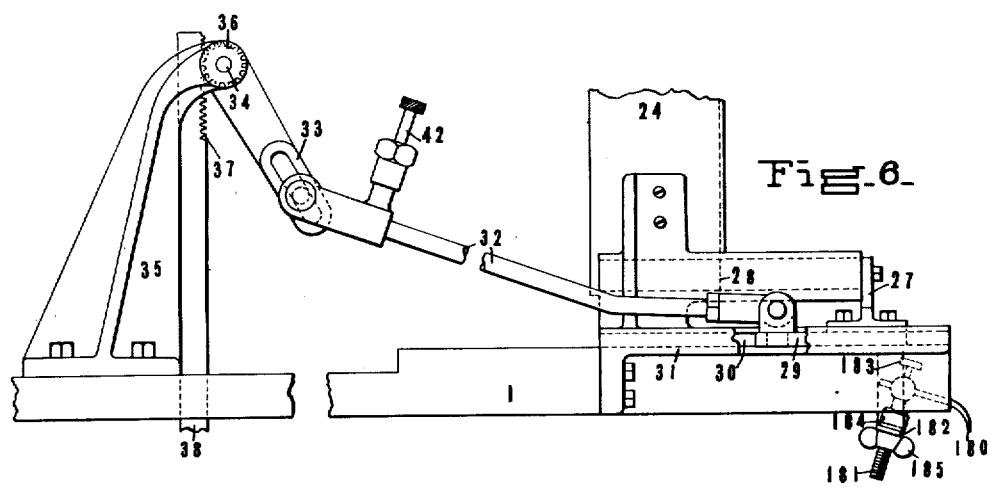
Figure 7:
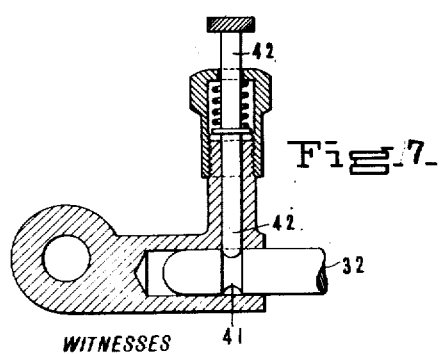
Figure 8:
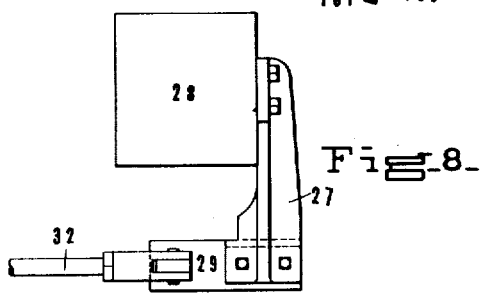
Figure 29:
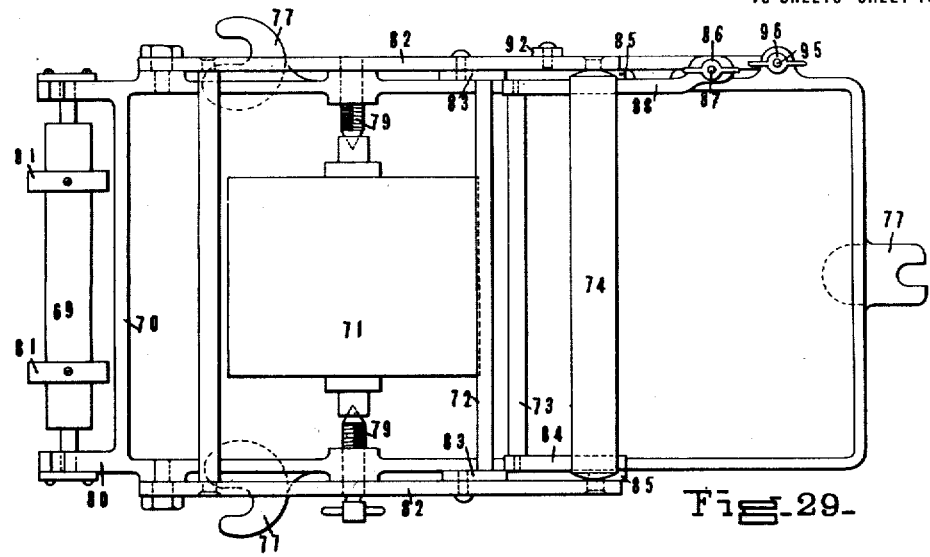
Figure 30:
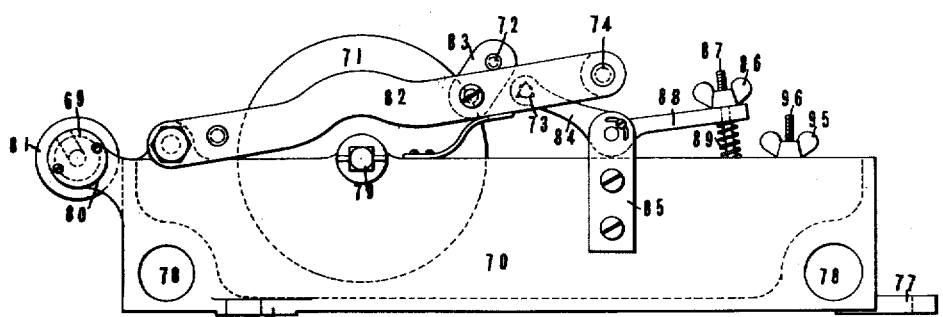
Figure 31:
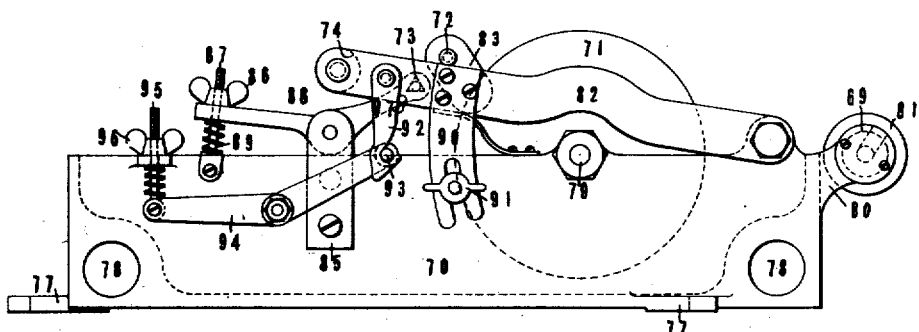

In the accompanying drawings, wherein is illustrated one of the possible embodiments of the invention,—Figures 1, 2 and 3 represent front, side and rear elevations, respectively, of a machine embodying the invention; Fig. 4 is a central longitudinal vertical section of portions of the machine on an enlarged scale; Figs. 5 and 6 are detail views showing the box magazine and the feeding mechanism for the boxes; Figs. 7 and 8 are detail views of a portion of the box feeding mechanism; Fig. 9 is a front view of a portion of the machine showing the box retainer and the web holder or tension device; Fig. 10 is a sectional view showing the web tension device from the side; Fig. 11 is a rear view showing the web cutting mechanism; Fig. 12 is a side view of the combined box and web feeding mechanism; Fig. 13 is an enlarged plan view of portions of the web feeding mechanism; Fig. 14 is a side view of the web feeding and adjusting mechanism; Figs. 15, 16 and 17 are detail views of elements of the adjusting mechanism; Figs. 18 and 19 are, respectively, side and sectional views of the gripping mechanism for conveying the boxes and web; Fig. 20 is a vertical cross section showing the clamping mechanism; Fig. 21 is a detail view; Fig. 22 is a front view of the mechanism for transferring the hinged boxes to the press; Fig. 23 is a side sectional view of this latter mechanism; Fig. 24 is a detail view; Fig. 25 illustrates the box pusher and its operating mechanism; Figs. 26, 27 and 28 are detail views of different operating mechanisms; Figs. 29, 30 and 31 illustrate the glue tank and gluing devices associated therewith from different points of view Fig. 32 illustrates a box, and label or hinge before folding; and Fig. 33 illustrates the hinged box in section.

It may be preliminarily noted that by means of this invention a continuous web of flexible material, such as thin paper, is automatically cut into separate labels or hinges, and each label or hinge applied to one of a series of boxes from a magazine and folded and secured thereon.

Referring now more in detail to the drawings, the machine comprises an upright frame comprising a table 1, supported by legs 2, spaced apart. The frame supports the operating elements of the machine, and in this embodiment, the mechanism for operating the devices for performing the several operations preferably comprises a driving shaft 3, located at rear of the machine and carrying pulley 4, driving gear 5 and hand wheel 6. Adjacent the driving shaft is a cam shaft 7, driven from shaft 3, pinion 8, and supporting cams 9, 10, and 11, adapted to respectively operate different portions of the mechanism at proper times as will hereinafter appear. At the forward end of the machine is located a second cam shaft 12, driven by a chain belt 13 from the shaft 7, as shown, and provided with a series of cams 14, 15, 16, 17, 18 and 19, adapted to operate portions of the mechanism as will also hereinafter appear. Intermediate the shafts 7 and 12 is a stub shaft 20, carrying a cam 21 operatively connected to the box supplying mechanism, the shaft 20 being driven from the chain by a sprocket wheel 22. A substantial bracket 23 is secured at the front of the frame and supports the glue pot and certain other elements as will appear hereinafter.

24 indicates an upright hollow shaft or magazine of a proper size to receive the boxes to be labeled or hinged and in which said boxes are arranged in a stack one above the other and are adapted to descend by gravity. The magazine is provided with supporting flanges 25 which retain the stack with the lower box in delivery position relative to a reciprocatory box feeding device or pusher, which pushes the boxes one by one from the bottom of the stack rearwardly through a delivery opening 26 into a retainer vertically in alinement with a cushion or rubber support on the box table below it.

The box pusher comprises a laterally projecting arm 27 having a supporting and pushing head 28 in alinement with the lowest box and connected to a slide bar 29 guided in a slot 30 in a horizontal bracket 31 secured to the frame. The pusher is a plate of a length sufficient to retain the remainder of the stack up while delivering a box therefrom to the retainer and until the pusher retreats for a new box. In order to operate the pusher, a connecting rod 32 is pivotally secured to the slide bar and to an arm 33 of a rock shaft 34 journaled in a bracket 35 on the frame, said shaft being provided with a pinion 36 engaged by a rack 37 at the upper portion of the rack bar 38, the lower portion of said bar having a slot 39 engaged by the stub shaft 20 and provided with an anti-friction roller 40 traveling on the cam 21 secured to said shaft. As the shaft rotates the cam raises and lowers the rack, which in turn causes the reciprocation of the pusher head in a manner which will be apparent. In order that any obstruction to movement of the head or any undue resistance shall not operate to cause a break of the machine parts or the crushing of the boxes, a yielding joint is provided; in this embodiment by making the connecting rod in sections and providing one section with an annular clutch face 41 engaged by a spring-held pin 42 on the other section. Should the operating mechanism of the pusher encounter any undue resistance, said joint will yield, as will be understood.

In horizontal alinement with the lower end of the magazine is a box retainer, comprising a pair of fixed adjustable guides 44 spaced apart and depending from a substantial bracket or yoke 45 mounted on the table. Movable box-supporting fingers 46 are pivoted to the guides and project into the space therebetween, being resiliently held in said space by springs 47 which readily yield to allow the box to be pressed downwardly out of the retainer into position between properly spaced guides 48 fixed to the table and adapted to be adjusted laterally of the machine. Playing between the box-supporting guides is a discharging plunger 49 supported on a plunger rod 50 passing through a guide 51 fixed to the yoke 45 and positively moved in a direction to discharge the box from the retainer by a rock lever 52, to one end of which the plunger is pivotally connected. The rock lever 52 is fulcrumed on a bracket 53 on the frame and the opposite end thereof is pivotally joined by an adjustable connecting rod 54 to a slotted guiding plate 55 embracing the cam shaft 12, said plate being provided with an anti-friction roller 56 coöperatively associated with the cam 19 on said shaft to reciprocate the plunger, a spring 57 tending to lift the plunger.

The labels or hinges 58 are composed of thin flexible paper which may be suitably ornamented on one face, the other face being preferably of such a character as to readily receive an adhesive such as glue. The label strips or hinges are preferably provided with marks or printed legends 59, and in the present embodiment the strips or hinges are provided from a continuous web 60 having said marks or legends at equal distances apart along its length, these marks being designed to be located at a definite position relatively to each box, preferably on the bottom of the box near the front edge. The labels are comprised in a continuous web coiled to form a supply roll of web 61 mounted on a drum 62 journaled in brackets 23 below the table. From the drum the web is threaded around a slack-producing device comprising a rod 63 mounted on an arm 64 of a rock shaft 65 joined by a connecting rod 66 to a crank pin 67 on the rotary cam shaft 12. The slack-producing device is so arranged as to unroll the roll of web and provide slack thereof so that when the web is fed by the grippers, as hereinafter described, the inertia of the roll may not have to be overcome. Having passed over the slack-producing device, the web is threaded respectively over and under a series of tension rods 68; thence over a guide roller 69 carried by a glue pot 70; thence over and in contact with a glue supply roller 71 which dips into the glue in the pot, this latter roller coating one surface of the web with adhesive material. On leaving the supply roller the web passes beneath an adjustable guide rod 72, thence past an adjustable scraper bar 73 and around another guide roller 74, so that the glued surface of the web will be upwardly presented in its further passage through the machine. This last-mentioned roller is spaced some distance from the table, so as to provide a substantial length of unsupported web before the same passes over another guide roller 75 held in brackets on the frame, from which latter roller the web is led along the surface of the table to a position beneath the box retainer, so that the box discharged from the retainer will rest on the glued surface of the web and be pressed thereagainst. Immediately beneath the web where the box contacts therewith the table is provided with a rubber face or block 76, the upper face of which is slightly convex or dome-shaped, so that when the box is pressed against the web, the latter is smoothly pressed thereover, all air bubbles, wrinkles, etc., being pressed out.

The gluing mechanism comprises a glue pot having slotted brackets or feet 77, by means of which it may be fastened to the bracket 23 and held in proper position relative to the other operating parts of the mechanism. The pot is provided with the customary jacket and openings 78 thereinto for the passage of steam or hot water to keep the glue in liquid condition. Journaled on adjustable studs 79 passing through the walls of the pot is the glue supply roller 71 dipping into the glue in the pot and transferring glue to the surface of the web. Journaled removably in slotted brackets 80 at one end of the pot is the guide roller 69 provided with adjustable collars 81, between which the web passes. Pivoted adjacent one end of the pot are spring-supported arms 82 carrying, at one end, the guide roller 74, and the guide rod 72 is supported in brackets 83 adjustably mounted on said arms. The scraper bar is substantially triangular in cross section and is supported by levers 84 pivoted to brackets 85 on the walls of the pot, said scraper bar being adjustably held in position by a collar or nut 86 adjustably engaging a pin 87, pivoted on the wall of the pot and engaged by an arm 88 secured to one of said levers, a spring 89 being interposed between the nut and pot. In order to secure the guide roller 74 in proper position and permit the same to be moved so as to easily thread or unthread the web, a slotted arm 90 is fixed thereto and is pressed against the wall of the pot by means of the nut 91. A pivoted hook 92 is secured to one of the arms 82 and is adapted to be engaged by a pin 93, on the end of a lever 94, the other end of lever 94 being adjustably mounted by means of pin 95 and nut 96. By adjusting the nut 96 the position of the pin 95 may be set as desired, and thereafter this adjustment of the pin will be maintained, notwithstanding the fact that the pivoted hook may be released from the pin and the guide roller moved on its pivot.

97 indicates a stop pin for the hook 92. In threading the machine the guide roller will assume position to which it may have been originally adjusted.

In this specific embodiment, the boxes are delivered from the magazine to the retainer, thence are pressed upon the end of the web and then the web and attached box are gripped by a feeding mechanism and moved in a direction to feed the web. This feeding movement having been accomplished, the web will extend from the box along the surface of the table, and it is designed to sever the web at such a point as to leave a sufficient amount extending from the box to fold against the side of the box across the joint of a two-part box and preferably enough to fold, also, on the top of the box. In order to provide the proper amount of web extending from the box, and in order that the front end of the web shall be located at a definite position relative to the edge of the box, a cutter mechanism is provided, which severs the web at a proper point relative to the position at which the box is delivered thereto. At the inner edge of the table, adjacent the place where the box is applied to the web, is located a vertically reciprocatory cutter platen 98 which, in its upper position, is flush with the table and in effect a continuation thereof. In its upper position said platen coöperates with a cutter disk 99 which passes back and forth across the same to sever the web and thereby determine the end of a label or hinge. The platen forms the upper face of a substantial connecting member or yoke 100 having vertical walls 101 guided in the frame, a rod 102 being adjustably secured to the bottom of the yoke and guided in a bracket 103 on the frame and terminating in an anti-friction roller 104 coöperating with the cam 16 on the shaft 12, a spring 105 connected to the yoke and bracket being adapted to assist in lowering the yoke.

A dovetailed horizontal groove 106 in the rear face of the yoke 45 forms a slideway for the web cutter, comprising a supporting plate 107 adapted to bridge the guide members 44 of the retainer and form a stop for the boxes fed into said retainer. The transverse dimension of the supporting plate 107 is sufficient to provide said stop at all positions of the cutter. The web cutter is reciprocated transversely across the width of the web in the cutting operation, and it is designed to cut or sever the web during the movement of the cutter in each direction, and to cause the cutter to dwell between each cutting operation in order to permit the web to be fed for a succeeding operation of the cutter. Accordingly to the cutter supporting plate is joined a rod or link 108, its opposite end being pivotally connected to one arm 109 of a rock lever, the other arm 110 of the latter being connected by a universal joint to one end of a connecting rod 111, also universally connected to a crank 112 on the end of a short shaft 113 mounted on a bracket 114, fastened to the bracket. The shaft 113 carries a pinion 115, driven by a mutilated gear wheel 116, on the shaft 12. The number of teeth of the gear 116 and the pinion 115 is so proportioned and arranged that as the gear 116 rotates the pinion 115 will be alternately turned one-half a revolution to move the cutter in one direction, and permitted to dwell for such time as may be required before a subsequent cutting takes place. The supporting plate is provided with transverse guides 117 between which is supported and guided a plate 118 carrying at its lower end the rotatable cutter disk or knife 99. Straps 119 retain the cutter plate on the head, and the cutter disk is mounted on a short shaft 120 projecting forwardly to position the cutting edge of the disk in the proper cutting line, as explained. A spring 121 engaging a relatively fixed pin 122 on the head 107 presses against a pin 123 projecting from the cutter plate so as to yieldingly press the disk against the web, and an adjustable stop pin 124 is also carried by the cutter plate and engages a lug 125 on one of the cross pieces to retain the cutter plate when the platen has been lowered. Tension fingers press against opposite edges of the web when the cutter operates and release said web when it is fed as hereinafter described.

The boxes to be labeled and hinged preferably comprise two elements, or sections, viz.: a container 126 and a cover 127, such as found in a cigarette box; and preferably one element is provided with the usual collar or neck, the two elements being telescoped to form the complete closed box and a number of these boxes being placed in the supply magazine. One aim of this invention is to provide the two elements with a hinge of flexible material, such as paper. If the boxes are to contain articles subject to tariff, notice to the public of compliance with the law is required, and, accordingly, the hinge material is printed with the customary notices, which may also be designated as marks as hereinbefore set forth, and when the hinge is applied to a box the notice is preferably located at a similar definite position on each box. To accomplish these results mechanically the boxes are arranged in the supply magazine so that when pushed into the retainer and pressed therefrom one edge of the bottom face of the boxes will overlap or extend beyond the cutting line about one-sixteenth of an inch, and to this end the boxes are stopped in the retainer by the cutter supporting plate in such position that when pushed therefrom by the retainer plunger the edges thereof will project beyond the cutting line by such amount. The web having been threaded in the machine to position beneath the retainer and its upper face having been glued, the cutter will operate to sever the web and the box is immediately thereafter applied to the web and pressed thereagainst, as has already been explained. In the further operation of the machine the box and web are gripped and together move in a direction to feed the web, and the next operation of the cutter severs the web on a line located, as explained, relatively to the succeeding box, and the feed of the web is sufficient to provide an amount of web material between the first box and the cutting line for the succeeding box such that when the web is severed for the next box the portion trailing from the first box will be sufficient to be folded over the jointed face of the box and preferably, as in the present embodiment, over a portion of that face of the box opposite to that to which the web was first applied.

In order to accomplish the feed of the box and the web to provide the proper length of material for the hinges and fold and secure the hinges to the box, the machine comprises the following construction: On the upper surface of the rear portion of the table is a horizontal guideway comprising spaced guide plates 128 supporting a reciprocatory gripper slide comprising a flat bar 129 engaging grooves in the guide plates. At its forward end the gripper slide carries a gripping mechanism comprising a pivot block 120 of T-shape in plan view pivotally joined to the gripper slide. The gripper comprises two jaws 131, the lower jaw being fastened to the pivot block and the upper jaw fast to a block 132 pivoted at 133 in ears of the pivot block, the jaws being movable toward and from each other, as will be apparent. In order to grip an article between the jaws, spring means are employed to move them toward each other, these means comprising studs 134 pivotally joined to the pivot block at either side of the T head of the said block and passing upwardly through slots 135 in the upper jaw, a relatively strong spring 136 encircling each stud and bearing at one end against a washer 137 interposed between each spring and the jaw, and at the other end against a nut or collar 138 threaded on the stud. The tension of the spring may be varied by adjusting the nuts on the studs. One of the jaws, preferably the upper, may be provided with a cushion, as a rubber block 139, set therein to afford a friction surface. The lower jaw is preferably beveled on its outside face as at 140, in order that it may be more readily entered between the web and the cutter platen. In order to avoid too close an approximation of the jaws by the springs and to afford means for positively separating the jaws at proper times, a link or pawl 141 is pivotally connected to one jaw, in this instance the lower, and is provided with an antifriction roller 142, which rides on the other jaw. In the present case, said link is U-shaped, the arms being pivotally connected to the pivot block and embracing a block 143 on the upper jaw. By this construction as the link is moved on its pivot from its central upright position the roller bears on the block on the upper jaw and will positively separate the jaws or permit them to approach each other, depending upon the distance the link is moved or the shape of the surface over which the roller travels.

In the present embodiment the forward motion of the link will depress the tail of the upper jaw and separate the jaws, and the surface of the block 143 is provided with a cam portion 144, against which the roller presses on its forward movement, to effect their separation. In order to maintain the jaws in this latter position, the block 143 is provided with a seat having a stop wall 145 to arrest and retain the roller. When the link is moved from the position last mentioned to the rear, the jaws approach each other and the limit of their approximation is determined by a stop wall 146. The surface of the block is so designed and the stops are so located as to permit the jaws to close sufficiently to grasp the articles to be gripped when the link is in one position, movement to the other position causing the jaws to separate sufficiently to release the articles gripped. Relatively light expansion coil springs 147 are interposed between the upper jaw and the gripper slide, the tendency of which is to turn the pivot block and both gripper jaws on the pivot 148, so as to depress both jaws simultaneously for a purpose hereinafter described. The grippers are moved forwardly into position to grasp the box and the web, and backwardly to carry these elements into position for further manipulation, and the reciprocation of the gripper is accomplished by means of a rock lever 149, fulcrumed on a cross rod 150, one end of the lever having a roller 151 engaging a cam groove 152 in the cam piece 9. As the gripper jaws overlap the box and the attached web, the pawl 141 strikes a stop or pin 153, and is forced rearwardly, permitting the jaws to close on the box and web. Adjacent the opposite end of the path of the gripper is a bracket 154, having a horizontal guiding opening carrying another pin 155 provided with a shoulder 156, nuts 157 and a spring 158. Pin 155 is thus yieldingly held in the path of the pawl 141, and may be adjusted to force the pawl forwardly to release the box and web. In the present embodiment, the pin for causing the closing of the jaws is mounted on the cutter supporting plate 107, so that when the cutter dwells, the pin will be in alinement with the pawl. As the gripper operates between the dwells of the cutter another similar pin 153 is provided which will assume proper position when the cutter is at rest on the opposite side of the web.

The material from which the labels are made and cut being a continuous flexible strip, and in the present instance of comparatively soft paper, it sometimes happens that in printing the notices 59 thereon, they are not uniformly spaced from each other. This condition may be due to irregularities in the operation of the press, or to unavoidable variations in the texture, density of the paper, atmospheric conditions, etc., whereby the web lengthens, shortens, wrinkles, etc., a moist atmospheric condition lengthening the paper and increasing the distance between the location of successive notices. A web containing notices adapted to so vary in the uniformity of their spacing might, when employed in this machine, fail to accurately register each notice with the position on the box predetermined therefor, and therefore provision is made for varying or adjusting the feed of the web to accurately register the notices with the articles to be hinged and labeled and with the cutting plane.

The gripper slide and the gripper connected thereto are so arranged as to draw a greater or less amount of the web, as desired, in order to neutralize inaccurate location of the notices relative thereto, and in order to vary or adjust the feed of the web, means are provided whereby the length of stroke of the gripper slide may be lengthened or shortened, and that while the machine is in operation. To the lever 149 is pivoted one end of a link 159 which may be adjusted in length by a turnbuckle, said link being rotatably adjustable on its pivot relative to said lever, and a connecting rod 160 pivotally joins the rotatably adjustable link with a bracket 161 secured to slide 129.

When the gripper is at the extreme forward end of its stroke in position to grip the box and web, the link 159 and the rod 160 are parallel, the pivotal connections between the link 159 and lever 149 being in axial alinement with the pivotal connection between the rod 160 and bracket 161, so that as the link 159 is adjusted around its pivotal connection to lever 149, the bracket and gripper slide are not displaced. Thus the successive assembled boxes and web are always gripped at the same relative point. By adjusting the link 159 around its pivotal connection with lever 149, the gripper will be translated either a greater or less distance for the same angular movement of cam track 152, depending on the direction of said adjustment. The track 152 has a concentric portion 152′, intermediate the extreme limits of its throw, which causes the gripper slide to dwell for a sufficient period to permit the cutter 99 to pass across and sever the web, the web being held or tensioned at this time between said grippers and the holding fingers 251 hereinafter described. After the web is cut the cam track 152 causes a slight further movement of the gripper slide, whereupon the pawl 141 contacts pin 155, and the grippers are opened to release the box. The required increase or decrease of the stroke of the gripper slide by the adjustment is ordinarily quite small, so that the point in the stroke at which the grippers are released is not displaced enough to interfere with the proper positioning of the box between the clamp jaws 192 and 193. It is designed to fix the relative position of the link and operating lever when in adjusted position, and it will be noted that the effective length of the operating lever is varied by the adjustment just described, inasmuch as the distance of the point of connection 162 between the connecting rod and said lever from the fulcrum of the lever is also changed. To support and adjust the link 159, and thus provide an extensible operating lever, the pivot pin 163 connecting the link and connecting rod is extended laterally, one end of a rack bar 164 being joined thereto, said rack bar extending alongside the lever near its fulcrum and being guided in a strap 165 journaled on the lever, said strap rotatably supporting a gear wheel 166 engaging the teeth 167 of the rack. The axis of the gear wheel 166 extends beyond the strap, and a universal joint 168 connects the axis to a connecting rod 169 extending upwardly and forwardly and joined by another universal joint 170 to a rod 171 journaled in an inclined bracket 172 secured to the frame of the machine in position convenient for operation by the person handling the machine. A handle or wheel 173 is connected to this rod, upon turning which the gear wheel 166 may be rotated to move the rack bar either to raise or lower the link and thereby change the effective length of the operating lever and adjust the stroke of gripper slide either forwardly or backwardly. A register plate or indicator 174 having a series of shallow circularly arranged depressions 175 is secured to the bracket and engaged by a spring-pressed pin 176 supported in an arm 177 secured to rod 171, so that the adjusted position of the gripper slide may be both indicated and yieldingly maintained. The rod 169 is provided with a pin 178 engaging a slot in a tubular extension 179 of the joint 168, whereby the rotary motion of the wheel 173 will be transmitted to the gear 166, and yet the rod 169 be permitted to lengthen or shorten as may be required during the operation of the machine.

A gage or pointer is fastened to the frame in such position that it may be adjusted in line with and close to the path of the web, so that the amount of feed of the web may be observed by noting whether or not the successive marks or notices coincide with the pointer during the intermittent feed of the web. Should the marks fail to coincide with the pointer, the register mechanism may be operated either one way or the other to vary the feed so as to bring the marks into coincidence with the pointer, and under these latter circumstances the operator will know that the marks are being applied to the box in proper position. The gage comprises a pointer 180, movably mounted on a rod 181, adjustably secured in an inclined bracket arm 182 fastened to the frame. A set-screw 183 holds the pointer 180 in position, the rod 181 being fastened to the bracket between an adjustable collar 184 and a nut 185. It is found advisable to locate a light 186, preferably electric, beneath the web opposite the gage in order that the notices may be viewed by transmitted light.

When the box and the end of the web are taken by the gripper they are together drawn rearwardly to a vertically reciprocatory carrier mechanism comprising clamp jaws, between which they are clamped and with which they are moved past other devices for further treatment. The frame top has an open portion 187 in rear of the assembly table, and depending from the bottom of the table are substantial brackets 188 providing guideways 189 in which move parallel vertical slides 190 and 191, each provided with an angularly projecting clamp jaw 192. A third clamp jaw or carrier plate 193 having a rubber upper surface is yieldingly connected to the slides by a rod 194 guided in a substantial head 195 joining said slides. The rod 194 is provided with a head 196, to which are pivotally connected one slotted end of two links 197, the opposite ends of said links being pivotally connected to the slides, respectively. Two other links 198 are pivoted at one end to the links 197, 197, respectively intermediate their ends, the other ends of the links 198 being pivotally connected to a connecting member 199 in turn pivotally jointed to a connecting rod 200 operated by means of a rock lever 201 fulcrumed on the rod 150, and engaged by a cam groove 203 in the cam element 11 on the shaft 7. Between the head 195 and a fixed collar 204 on the carrier rod is a coil spring 205 to yieldingly support said carrier plate relatively to the clamp jaws on the slides and between said head 195 and the head 196 at the lower end of the rod is a somewhat stronger spring 206. At a suitable point on the guideways is a stop comprising a cross piece 207 adapted to be engaged by a lug 208 on the head 196. At the bottom of the guideways adjustable stop pins 209 are secured against which the ends of the slides abut. When the box and web are gripped by the feeding mechanism they are together drawn over the table and the springs 147 cause the grippers to tilt relatively to the rod 129 and bodily move the box at a slight angle so as to wipe the web against the edge 210 of the table as it is drawn off the same, thus smoothing the web on the box. Further feed of the grippers causes the box to be transferred into vertical alinement with the plate 193, and the pawl 141 to be thrust forward to open the grippers and deposit the box upon the carrier plate beneath the clamp jaws on the slides. The connecting rod 200 will then be lowered, and as the spring 205 will offer some resistance to its downward movement, the links 197 will fulcrum on the head 196, thus causing the jaws 192 to move against and clamp the box to the third jaw or carrier plate 193. The further downward movement of the connecting rod will lower the three jaws, together with the box and its trailing hinge strip or label, until the slides strike the stops 209 at the bottom of the guideways, whereupon the carrier plate will be moved a slight further distance, thus releasing the grip on the box, at which time a horizontal pusher operates to eject the box from these jaws, after which the reverse motion takes place and the three gripper jaws are restored to position, ready for the reception of the next box, the stop 207 serving to limit the upward movement of the carrier plate, permitting the cam 203 to raise the jaws a sufficient distance above the carrier plate to receive the box therebeneath.

Fastened to the frame adjacent the path of the downwardly moving box with its attached unfolded label or hinge, on the side of the trailing label and in vertical alinement therewith, is a wiper which, as the box passes thereby, folds or wipes the label or hinge up against the side of the box across the joint. In the present embodiment this wiper or folding device comprises a brush 211, the bristle surface of which inclines, or is beveled toward the box from its upper end, and eventually intersects the path of the side wall of the box so as to smoothly press and wipe the label against the box as it is carried past by the clamp jaws. Extending forwardly and rearwardly from an intermediate point of the brackets 188 are horizontally oppositely disposed brackets forming guideways 212, 213, spaced apart sufficiently to permit the box to pass therebetween, and to these front brackets is bolted an open rectangular frame 214 from the inner, upper and lower faces of which extend brushes 215, 215, between which the box passes after leaving the carrier plate. The pusher comprises slide rods 216, 216, joined by a cross piece 217 and adapted to move back and forth in the guideways 212, 213, being spaced apart sufficiently to escape the sides of the carrier mechanism, each rod having an inwardly projecting head 218 adapted to engage the box. The pusher is reciprocated by means of an adjustable connecting rod 219 connected to a rock lever 220 fulcrumed on the rod 150, and operatively connected in a cam groove 221 of the cam element 10. The vertical brush 211 is bolted to the top of the horizontal frame 214. When the carrier plate has reached its lowest position and the clamp jaws have been released, the pusher advances and forces the box and its now upstanding hinge strip between the brushes 215, which latter fold the strip down onto the upper surface of the box and smooth and press both this portion of the strip and the lower portion also. The extent of movement of the pusher is sufficient to move the box beyond the horizontal brushes and preferably into a transferring device, by means of which the boxes are delivered to a receiving magazine, in which they are stacked and the labels or hinges pressed.

The numeral 222 indicates a box-carrying head comprising guiding and supporting arms 223 between which the box is received, pivotally mounted on a bracket 224 attached to a fixed part of the machine, as the top of the press, so as to be capable of assuming position in line with the box as it leaves the horizontal brushes, and rotatably transfer the box to the press or magazine. Fixed to the head is a gear segment 225 meshing with a similar segment 226 journaled in a bracket on the frame, and a spring 227 connects the latter segment and the frame and operates to yieldingly raise the transferring head to horizontal position in line with the brushes 215. In order to positively rotate the segment 226 and thereby move the head 222 to cause the transfer of the box to the magazine, a lever 228 fulcrumed on the frame is joined to said segment by a connecting rod 229, and a roller 230 on the lever contacts with the cam 15 on the shaft 12 and is positively raised to rotate the segment against the resistance of the spring.

Between the box-supporting arms of the transferring head is an ejector comprising a plunger head 231 secured to a rod 232 passing through a guiding opening in the transferring head and held in its inner position by a spring 233 surrounding the plunger rod between the transferring head and a collar 234 on the plunger rod. Preferably the supporting arms of the transferring head are provided with spring fingers 235 which extend within the arms and yieldingly support the box.

The head 222 is rotated and carries the box into position adjacent a receiving opening of a press, and dwells in such position long enough for the box to be ejected, which latter operation is accomplished by a bell-crank lever 236 fulcrumed on a stud 237 on the frame, and operated by the cam 18, through a lever 238 having a roller 239, and connected to the lower arm 240 of the lever by a link 241. The head 222 comes to rest in its lower position closely adjacent the receiving opening of the press, and with its plunger rod 232 in alinement with the bell-crank, upon the operation of which latter the box is ejected, and forced into the press.

After the boxes are labeled and hinged it is desirable to press the adhesively applied strips, and to collect the boxes in an orderly manner, and to this end the receiving magazine for collecting the boxes embodies elements to press the affixed strips. The press and receiving magazine comprises a tubular chamber 242 having three fixed walls and one movable wall, the former firmly braced on the frame by a strong web 243. The movable wall or press head 244 is preferably faced with rubber and is loosely mounted between the upper and lower walls, being supported and operated by a substantial lever 245, to which it is pivotally joined by a stud 246 adjustably secured in a fork 247 of the lever. The lever 245 is fulcrumed on a strong bracket 248, and the cam 14 coöperates with a roller 249 to positively cause the pressing operation, relief being accomplished by a spring 250. The press head is relieved when the boxes are pushed into the receiver by the ejector plunger, and the succeeding boxes advance those first introduced, so that each box receives pressure several times during its travel in the receiving magazine, the boxes finally emerging from the opposite end of the magazine onto a platform or into a suitable receptacle as may be desired.

The continuous web is held on the table while and after being cut and while the box is pressed thereagainst by curved narrow fingers 251, pivoted to brackets 252, overhanging slots 253 in the edge of the table, the convex portions of the fingers contacting the glued face of the web and firmly pressing the web against the table at proper times, said fingers coöperating with the gripper jaws to tension the web while being cut. The fingers are simultaneously moved to and from pressing position by links 254, connecting the arms 255 of the fingers to a pivoted cross head 256, on opposite sides of its pivot, a third link connecting the cross head to a rock arm 257, in turn joined by a connecting rod 258 to a lever 259, operated by the cam 17. The length of the curved fingers is disposed longitudinally of the web, and their construction as described tends to prevent the web clinging thereto, or any great quantity of glue accumulating thereon.

The operation and purpose of the machine will be apparent from the foregoing, but may be briefly summed up as follows: A roll of web of the desired material, with marks or notices at equal intervals or spaces thereon, is mounted on the drum 62, and its end passed beneath the bar 63, thence is threaded between the tension device 68, over the glue supply roller, scraper bar, around the guide roller and thence to the table over the yielding dome-shaped surface. A number of sectional elements, in this instance sectional or two-part rectangular, or prismatic boxes, are placed in the magazine 24, where they rest upon the flanges 25. The cutter may be operated once to cut the end of the web, so as to provide an edge of the web in proper position relative to the box supply device, and the web should be adjusted so that the cut shall occur at the proper point relative to the mark or notice to position said mark at the desired point on the box, preferably near the front wall, the gage being then set in alinement with a mark on the web in convenient position to be viewed. The machine being set in operation, a box will be delivered from the magazine onto the glued surface of the web and its bottom pressed thereagainst, and the front wall, or side of the box, will extend slightly beyond the edge of the web. The gripper jaws will next advance in open condition and pass over and under the thus assembled elements, whereupon one of the stop pins on the cutter mechanism will push the pawl off its front seat, permitting the gripper jaws to close on the box and web and firmly grip the same. The cutter platen will be lowered in a line transverse to the plane of the web at the proper time to permit the lower gripper jaw to readily assume gripping position. Rearward movement of the grippers will draw the box and assembled portion of the web from the assembly table, the grippers taking a slight angular position relatively to the slide so as to wipe the web along the edge 210 of the table to smooth the same on the box. The extent of movement of the grippers is so designed as to draw or feed the web a sufficient amount to bring the next mark into such position relative to the box supply device as was the first mark, and preferably these marks are so spaced that the feed of the web as aforesaid will provide an amount of web material extending from the box adapted to be folded against an adjacent side across the joint between the container and the cover and, in this embodiment, also on the side of the box opposite the bottom. The box will now be grasped between the clamp jaws of the carrier, the cutter, moving parallel to the plane of the web, will sever the web at the proper point, and the trailing extension thereof will be subsequently folded and adhesively affixed across the joint and the head, thus securely hinging the sections of the box together. The pusher 216 will deliver the assembled elements into the transfer head which will carry them to the press and force them thereinto one after the other, and in such position that the hinge side will be pressed by the press head, and more efficaciously secured. Failure of the marks to register with the desired portion of the box will be indicated by their failure to register with the gage, whereupon the amplitude of reciprocation of the gripping mechanism may be varied at will to restore their registry, while the machine is operating. It will be observed that the lever operating mechanism of the box and web feeding mechanism provides an extensible lever, the length of which may be varied as the machine operates. It will be also noted that this invention offers a means of automatically supplying a plurality of boxes and a continuous web, dividing the web into fractions or sections, preferably marked, and affixing the sections to the boxes, respectively. Thus, when the strip of material hereinbefore sometimes referred to as the label strip, is not provided with marks, this invention offers a means of efficiently assembling sections of the same with the boxes in the manner described, and whereby the end of the strip may be accurately placed in predetermined position relative to the box. It will be observed that the front edge of the web 60, when being assembled with the box, is between the box and the table and a direct view of the assembly relation of the two elements is thus obscured. The pointer 180, the handle 173 and indicator 174 are disposed at points within convenient view of the operator, so that the assembly relation of the box and the edge of the web in their obscured position may be readily noted, and the amount of the feed of the web varied as may be desired or required. Furthermore the handle 173 is relatively stationarily mounted, so that it may be easily and accurately manipulated while the machine is in operation, said handle not partaking of the movements of the machine in normal operation.

Thus, by the above described construction is provided a machine which accomplishes in a simple and efficient manner the objects hereinbefore referred to.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. In an apparatus of the character described, in combination, means adapted to determine the position of an article, means adapted to intermittently feed a web to position adjacent said positioning means, a relatively stationarily supported handle, and connections between said handle and said feeding means whereby the feed of the web will be varied on movement of said handle.

2. In an apparatus of the character described, in combination, means adapted to determine the position of a box, a magazine adapted to contain a plurality of boxes, means adapted to alternately feed a web to position adjacent the first mentioned means and sever a section therefrom, and means adapted to successively feed boxes from the magazine to position adjacent the positioning means and attach the same to the successive ends of the web, respectively.

3. In an apparatus of the character described, in combination, means adapted to determine the position of an article, means adapted to intermittently feed a web to position adjacent said position determining means, means adapted to successively feed articles onto said web in similar positions relative to said position determining means, a relatively stationarily supported handle, and connections between said handle and said web feeding means whereby the amount of feed of the web may be varied by movement of said handle.

4. In an apparatus of the character described, in combination, a box supply mechanism, a web supply mechanism, means adapted to determine the position of a box, means whereby boxes from the supply mechanism are successively adhesively attached to the end of the web adjacent the positioning means, means adapted to move the attached web and box and thereby feed the web, means adapted to vary the movement of the attached elements to vary the feed of the web, and means adapted to fold the web on the box.

5. In an apparatus of the character described, in combination, means adapted to supply boxes, means adapted to supply a web, means adapted to adhesively attach a box of the supply to the web, means adapted to move the assembled elements and thereby feed the web, and means adapted to vary the last-named movement and maintain the same relative assembly relation between succeeding boxes and the web.

6. In an apparatus of the character described, in combination, a table, a box supply device, a continuous web supply, means adapted to coat the web with an adhesive, and means adapted to coöperate with the table to press a box, while at rest, against the coated surface of the web to join them together.

7. In an apparatus of the character described, in combination, means adapted to supply sectional boxes, means adapted to supply a continuous web, and means adapted to divide the web into sections and adhesively attach the sections of the web to the sections of the boxes across the joints of the boxes, respectively, comprising means whereby the sections are progressively wiped against the box sections adjacent the joint.

8. In an apparatus of the character described, in combination, means adapted to supply boxes, means adapted to supply a continuous web, means adapted to adhesively attach in predetermined relation a box of the supply with the web, means adapted to move the attached elements from assembly position and thereby feed the web, means adapted to vary the last-mentioned movement to bring a predetermined portion of the web into similar predetermined assembly position, and means adapted to sever the web.

9. In an apparatus of the character described, in combination, means adapted to supply sectional boxes, means adapted to supply an amount of continuous web sufficient to hinge a plurality of said boxes, and means adapted to divide the web and fold and adhesively secure the fractions, respectively, across the joint of the sections of the respective boxes to hinge the sections together comprising an elastic dome-shaped block.

10. In an apparatus of the character described, in combination, a box supply, a web supply, reciprocatory means adapted to intermittently feed the web and adhesively secure the same to a box of the supply, and means permitting variation in the feed of the web in a continuous manner while the machine is in operation.

11. In an apparatus of the character described, in combination, a table, means adapted to assemble a box and the end of a continuous web on said table, a carrier, reciprocatory mechanism adapted to move the assembled elements to the carrier and thereby feed the web relatively to the table, means adapted to sever the web at a point to provide a portion extending from the box, and means adapted to retain the end of the continuous web on the table.

12. In an apparatus of the character described, in combination, a table, means adapted to assemble a box and the end of a continuous web on said table, a carrier, reciprocatory mechanism adapted to move the assembled elements to the carrier and thereby feed the web relatively to the table, means adapted to sever the web at a point to provide a portion extending from the box, a wiper, and means adapted to reciprocate the carrier adjacent the wiper in a path intersecting that of the feeding mechanism.

13. In an apparatus of the character described, in combination, a table, means adapted to assemble a box and the end of a continuous web on said table, a carrier, reciprocatory mechanism adapted to move the assembled elements to the carrier and thereby feed the web relatively to the table, means adapted to sever the web at a point to provide a portion extending from the box, a wiper, a means adapted to reciprocate the carrier adjacent the wiper in a path intersecting that of the feeding mechanism, a second wiper, a pusher, and means adapted to reciprocate the pusher in a path adjacent the second wiper and intersecting that of the carrier.

14. In an apparatus of the character described, in combination, a table, means adapted to assemble a box and the end of a continuous web on said table, a carrier, reciprocatory mechanism adapted to move the assembled elements to the carrier and thereby feed the web relatively to the table, means adapted to sever the web at a point to provide a portion extending from the box, a wiper, means adapted to reciprocate the carrier adjacent the wiper in a path intersecting that of the feeding mechanism, a pair of oppositely disposed wipers, a pusher, and means adapted to reciprocate the pusher and thereby move the box from the carrier between the pair of wipers in a path intersecting that of the carrier.

15. In an apparatus of the character described, in combination, a table, means adapted to assemble a box and the end of a continuous web on said table, a carrier, reciprocatory mechanism adapted to move the assembled elements to the carrier and thereby feed the web relatively to the table, means adapted to sever the web at a point to provide a portion extending from the box, a wiper, means adapted to reciprocate the carrier adjacent the wiper in a path intersecting that of the feeding mechanism, a second wiper, a pusher, a transferring device adapted to reciprocate in a path intersecting that of the pusher, and means adapted to reciprocate the pusher in a path adjacent the second wiper and intersecting that of the carrier and deliver the box into the transferring device.

16. In an apparatus of the character described, in combination, a box supply device, a continuous web supply device, a stationary table, means for adhesively assembling a box of the supply with the continuous web on the table, means for severing the web to provide a section thereof attached to the box, and means for repeating the aforesaid operations.

17. In an apparatus of the character described, in combination, a box supply magazine, a pusher head, a slide bar connected thereto, a connecting rod pivotally joined to said bar, a rock arm pivotally joined to said rod, a pinion on said arm, a rack and means to reciprocate the rack.

18. In an apparatus of the character described, in combination, a table, a box magazine having flanges adapted to support a stack of boxes spaced from the table, a guide way on the table, a bar in said guideway, an arm connected to said bar, a pusher head supported by said arm in alinement with one of the boxes, a bracket on said table, a rock arm journaled thereon and having a pinion, a rack engaging said pinion and having a slot, a cam shaft passing through said slot, a roller on said rack, and a cam engaging said roller.

19. In an apparatus of the character described, in combination, a table, and box supply mechanism comprising brackets bolted to the end of the table and having upwardly extending arms, an upright magazine secured between said arms, a guideway on one of said brackets, a slide bar in the guideway, a pusher connected to the slidebar and means to reciprocate said pusher.

20. In an apparatus of the character described, in combination, a box supply device, a web supply device, a table, means adapted to adhesively assemble a box of the supply with the web, means to move the attached elements relatively to the table, and means whereby said movement causes the web to be wiped against the box.

21. In an apparatus of the character described, in combination, a table having a resilient face, a guideway above the table, means adapted to move boxes along said guideway into predetermined position above the table, means adapted to position a web between the resilient face of said table and a box in said predetermined position, and means adapted to press the boxes from the guideway against the web opposite said face.

22. In an apparatus of the character described, in combination, a box retainer comprising spaced guides, a cutter comprising an element positioned to operate as a stop to movement along the guides in one direction, means adapted to move boxes to and from the guides, and means adapted to operate the cutter and maintain the stopping relation of said element.

23. In an apparatus of the character described, in combination, a table, a box retainer comprising resilient supporting and guiding members spaced from the table and from each other, a cutter comprising a supporting plate extending across the guiding members, a magazine, means to deliver boxes between said members from the magazine, and a plunger adapted to press the boxes from the members to the table.

24. In an apparatus of the character described, in combination, a horizontal table having fixed guides, a vertically disposed yoke thereon, a horizontal guideway secured to said yoke and comprising resilient supporting members, a vertically reciprocatory plunger adapted to move in line with the guideway, a cutter comprising a supporting plate closing one end of the guideway, a box supply device, and means adapted to move boxes from the supply device into the guideway and thence to the table.

25. In an apparatus of the character described, in combination, a stationary table having a yielding face, box-supporting guides adjacent said face, means adapted to feed a web onto said face, and means adapted to deliver a box from said guides onto said web and press the same thereagainst.

26. In an apparatus of the character described, in combination, a box retainer comprising spaced guides, a table adjacent the retainer, means adapted to deliver a web on said table, a web cutter comprising an element positioned to operate as a stop to movement along the guides in one direction, means adapted to operate the cutter to successively sever the web, and means adapted to successively assemble boxes from said guides and the respective ends of said web.

27. In an apparatus of the character described, in combination, a table, means adapted to deliver a box to predetermined position on said table, means whereby a web is interposed in the path of the box, and means adapted to assemble the box and a portion of the web comprising a cutter adapted to sever the web within the path of the box.

28. In an apparatus of the character described, in combination, a cutter platen, means adapted to intermittently feed a web across said platen, means adapted to successively press boxes against said web opposite said platen to attach said boxes to said web, said web feeding means comprising reciprocatory grippers adapted to grasp said web opposite said platen, a cutter adapted to move along said platen to sever said web, means to successively reciprocate said cutter, and means adapted to cause relative separation of said cutter and platen in a plane transverse to that of said web between successive grippings of the web by said grippers.

29. In an apparatus of the character described, in combination, a table, means adapted to adhesively assemble a box and the end of a web on said table, a gripper support, gripper jaws movable relatively to each other carried by said support, means adapted to cause said jaws to grasp the assembled box and web and move the same from said table, and means adapted to simultaneously tilt said jaws relative to said table before the box leaves said table, and in a direction to wipe the adhering portion of the web against the box.

30. In an apparatus of the character described, in combination, a table, means adapted to assemble a box and a web thereon, a reciprocatory gripper adapted to grasp the assembled parts, and means adapted to cause separation of the assembled parts relative to said table at those parts operated upon by the gripper.

31. In an apparatus of the character described, in combination, a table, comprising a movable portion, means adapted to assemble a box and a web on the table, a gripper, and means adapted to operate the movable portion of the table to permit the gripper to grasp the assembled parts adjacent thereto.

32. In an apparatus of the character described, in combination, a table, provided with a movable section comprising a cutter platen, means adapted to assemble an article with a web on said table, a cutter adapted to move over the platen in the cutting operation, a cam, and means coöperatively associated with the cam and platen to depress the movable section.

33. In an apparatus of the character described, in combination, a carrier plate, clamp means, means to move the clamp means toward the plate, means adapted to simultaneously move the plate and clamp means, means to move the plate away from the clamp means and a folding device adjacent the path of movement of said plate.

34. In an apparatus of the character described, in combination, a carrier plate, clamp means, means to move the clamp means toward the plate, means adapted to simultaneously move the plate and clamp means, means to move the plate away from the clamp means, means to subsequently move the plate toward the clamp means and a folding device adjacent the path of movement of said plate.

35. In an apparatus of the character described, in combination, a plurality of clamp jaws, a link pivotally connecting said jaws, means connected to said link to move the jaws, means adapted to yieldingly resist the movement of one of said jaws and folding devices adjacent the path of movement of said jaws.

36. In an apparatus of the character described, in combination, a plurality of clamp jaws, a link pivotally connecting said jaws, means connected to said link to move the jaws, means adapted to yieldingly resist the movement of one of said jaws, a stop in the path of one jaw and folding devices adjacent the path of movement of said jaws.

37. In an apparatus of the character described, in combination, a plurality of clamp jaws, a link pivotally connecting said jaws, means connected to said link to move the jaws, means adapted to yieldingly resist the movement of one of said jaws, stops in the path of each jaw and folding devices adjacent the path of movement of said jaws.

38. In an apparatus of the character described, in combination, a plurality of clamp jaws, a link pivotally connecting said jaws, means connected to said link to move the jaws, means adapted to yieldingly resist the movement of one of said jaws, stops to limit motion of one jaw in one direction and the other in the opposite direction and folding devices adjacent the path of movement of said jaws.

39. In an apparatus of the character described, in combination, a slide having a clamp jaw, a second clamp jaw guided thereby, a spring tending to cause said jaws to approach each other, a link connecting said jaws, means connected to said link to move the jaws against the resistance of the spring and folding devices adjacent the path of movement of said jaws.

40. In an apparatus of the character described, in combination, parallel guideways, slides therein each having a clamp jaw, a guide piece connecting said slides, a rod passing through the guide piece and having a third clamp jaw adapted to coöperate with the jaws of the slides, a spring tending to move the third clamp jaw toward the other jaws, links pivotally connected to the rod and each slide, respectively, a connecting rod flexibly connected to each link, stops to limit movement of the slides in one direction, a stop to limit the movement of the rod in the opposite direction and folding devices adjacent the path of movement of said jaws.

41. In an apparatus of the character described, in combination, a frame, an oscillatory box carrying head pivoted thereto having a gear, a gear on the frame meshing with the first-mentioned gear, positive means to move the gears in one direction, and resilient means to move them in the opposite direction.

42. In an apparatus of the character described, in combination, an upright frame, a press mounted thereon and comprising a tubular chamber having a movable upright press head, a guideway for boxes, a head comprising supporting arms adapted to receive boxes from said guideway, means adapted to move the head to transfer the boxes adjacent the opening in the press, means adapted to deliver the boxes from the head to the press, and means adapted to move the press head to press the boxes.

43. In an apparatus of the character described, in combination, a table, means adapted to feed a web on said table and attach a box thereto, a pivoted holding finger, a web cutter, and means adapted to move the finger to press the same against the web while the web is being cut.

44. In an apparatus of the character described, in combination, a web support, means adapted to feed a web thereon, means adapted to attach a box to said web, curved web-gripping fingers pivoted at each side of the web, a rock lever, links pivotally connected to the rock lever and each finger, a rock arm, a rod connecting the arm and rock lever, and means to rock said arm to cause the fingers to grip and release the web.

45. In an apparatus of the character described, in combination, a table, gripping mechanism adapted to move toward and from the table, a cutter adapted to move across the table, means adapted to hold a web on the table, means adapted to successively apply boxes to the web, and adhesively attach the same together, and means to automatically operate the aforesaid elements to successively adhesively secure sections of the web to the boxes.

46. In an apparatus of the character described, in combination, a table, means adapted to hold a portion of a continuous web thereon, means adapted to successively adhesively assemble boxes with the web on the table, a carrier, mechanism adapted to grip the assembled elements and move them to the carrier, and mechanism adapted to sever the web at a point remote from the box after the last mentioned movement.

47. In an apparatus of the character described, in combination, a table, means adapted to hold a portion of a continuous web thereon, means adapted to successively adhesively assemble boxes with the web on the table, a carrier, mechanism adapted to grip the assembled elements and move them to the carrier, mechanism adapted to sever the web at a point remote from the box after the last mentioned movement, folding devices, and mechanism adapted to move the carrier past the folding devices to fold the training strip of web against the box.

48. In an apparatus of the character described, in combination, a support, a box supply device, a source of web supply, means adapted to dispose the web on the support, means adapted to successively feed boxes onto the web on the support, means adapted to remove the box from the support and move the web relatively to the support, and means adapted to sever the web to provide a section separate from the supply.

49. In an apparatus of the character described, in combination, a support, a box supply device, a source of web supply, a web gluing device, means adapted to hold the web on the support, means adapted to successively feed boxes onto the glued end of the web on the support thereby adhesively attaching the box to the web, means adapted to remove the box from the support and draw the web thereacross, and means adapted to sever the web to provide a strip extending from the box.

50. In an apparatus of the character described, in combination, a support, a box supply device, a source of web supply, a web gluing device, means adapted to hold the web on the support, means adapted to successively feed boxes onto the end of the web on the support, means adapted to remove the box from the support and draw the web thereacross, means adapted to sever the web to provide a strip extending from the box, means adapted to fold the strip against the adjacent side of the box, and means adapted to press the folded strip against the box.

51. In an apparatus of the character described, in combination, a support, a box supply device, a source of web supply, a web gluing device, means adapted to successively feed boxes onto the glued end of the web attached to the box after said last mentioned movement on the support, mechanism comprising reciprocatory gripper jaws adapted to draw the assembled web and box from the support and the web thereacross, and means adapted to sever the web to provide a strip extending from the box.

52. In an apparatus of the character described, in combination, a support, a box supply device, a source of web supply, a web gluing device, means adapted to successively feed boxes onto the web on the support, mechanism comprising reciprocatory gripper jaws adapted to draw the assembled web and box from the support and the web thereacross, a carrier comprising clamping jaws, wiper mechanism, means whereby the gripper jaws are caused to deposit the assembled elements on the carrier, and means adapted to move the carrier past the wiper mechanism to fold the extended strip against the box.

53. In an apparatus of the character described, in combination, a support, a box supply device, a source of web supply, a web gluing device, means adapted to successively feed boxes onto the web on the support, mechanism comprising reciprocatory gripper jaws adapted to draw the assembled web and box from the support and the web thereacross, means adapted to sever the web to provide a strip extending from the box, a carrier comprising clamping jaws, a pusher, relatively angularly disposed wiper devices adjacent the paths of the carrier and the pusher, means whereby the gripper jaws are caused to deposit the assembled elements on the carrier, means to cause said elements to be held by the clamp jaws, and means adapted to operate the carrier and the pusher to move the elements past the wiper devices to fold the extended strips on the adjacent and opposite sides of the box.

54. In an apparatus of the character described, in combination, a support, a box supply device, a source of web supply, a web gluing device, means adapted to successively feed boxes onto the web on the support, mechanism comprising reciprocatory gripper jaws adapted to draw the assembled web and box from the support and the web thereacross, means adapted to sever the web to provide a strip extending from the box, a carrier comprising clamping jaws, a pusher, relatively angularly disposed wiper devices adjacent the paths of the carrier and the pusher, means whereby the gripper jaws are caused to deposit the assembled elements on the carrier, means to cause said elements to be held by the clamp jaws, means adapted to operate the carrier and the pusher to move the elements past the wiper devices to fold the extended strip on the adjacent and opposite sides of the box, an oscillatory transfer device into which the assembled and folded elements are delivered, a press, means adapted to move the transfer device to position adjacent the press, and means adapted to eject the elements from the transfer device into the press.

55. In an apparatus of the character described, in combination, a support, a box supply device, a web supply device, a web gluing device, means adapted to successively feed boxes onto the web on the support, mechanism comprising reciprocatory gripper jaws adapted to draw the assembled web and box from the support and the web thereacross, means adapted to sever the web to provide a strip extending from the box, a carrier comprising clamping jaws, a pusher, relatively angularly disposed wiper devices adjacent the paths of the carrier and the pusher, means whereby the gripper jaws are caused to deposit the assembled elements on the carrier, means to cause said elements to be held by the clamp jaws, means adapted to operate the carrier and the pusher to move the elements past the wiper devices to fold the extended strip on the adjacent and opposite sides of the box, an oscillatory transfer device into which the assembled and folded elements are delivered, a receiving magazine comprising a press, means adapted to move the transfer device to the receiving magazine, means to eject the assembled elements from the device into the magazine, and means to cause the intermittent operation of the press to press the folded elements at intervals during their passage through the magazine.

56. In an apparatus of the character described, in combination, a support, a box supply device, a web supply device, a web gluing device, means adapted to successively feed boxes onto the web on the support, reciprocatory gripping mechanism adapted to draw the assembled web and box from the support and the web thereacross, and reciprocatory cutting mechanism adapted to sever the web during its periods of rest, and comprising means to cause the gripping mechanism to close on the assembled elements.

57. In an apparatus of the character described, in combination, a support, a box supply device, a source of web supply, a web gluing device, means adapted to successively feed boxes onto the web on the support, reciprocatory gripping mechanism comprising an operating pawl adapted to draw the assembled web and box from the support and the web thereacross, reciprocatory cutting mechanism adapted to sever the web during its periods of rest, and stop pins carried by the cutting mechanism adapted to be positioned in line with the pawl to operate the same when the cutter is stationary.

58. In an apparatus of the character described, in combination, means adapted to feed a web comprising a reciprocatory device adapted to grip the web, means adapted to vary the amplitude of the stroke without varying the termination of the stroke at one end and means adapted to attach said web to a box.

59. In an apparatus of the character described, in combination, means adapted to attach a web to a box, a reciprocatory web feeding device comprising gripper jaws, a movable pawl carried thereby and adapted to cause the grippers to open and close, stop devices adapted to be located in the path of the pawl at relatively fixed points, and means adapted to vary the amplitude of reciprocation of the reciprocatory device.

60. In an apparatus of the character described, in combination, a stationary support, a web supply device, a box supply device, means adapted to divide the web into sections, means adapted to assemble the boxes and sections on the support respectively, a carrier adapted to move in a fixed path, means adapted to move the assembled elements from the support to substantially similar position on the carrier, and simultaneously vary the feed of the web.

61. In an apparatus of the character described, in combination, reciprocatory mechanism adapted to feed a web, means adapted to attach said web to a box, and means adapted to vary the amplitude of the reciprocatory movement without varying the termination of the stroke at one end.

62. In an apparatus of the character described, in combination, a continuous web supply, means adapted to attach the web to an article, a cutting mechanism, reciprocatory mechanism adapted to intermittently grip and feed the web past the cutting mechanism, means to cause the cutting mechanism to sever the web when same is at rest, and means whereby the feed mechanism is caused to successively grip the web supply at similar points.

63. In an apparatus of the character described, in combination, a continuous web supply device, a cutting mechanism, a box supply device, means adapted to successively assemble boxes with the end of the continuous web, reciprocatory mechanism adapted to grip the assembled elements and move the same past the cutting mechanism, means to cause the cutting mechanism to sever the web when at rest, and means whereby the feed mechanism is caused to grip the succeeding assembled boxes and web at a constant relative point.

64. In an apparatus of the character described, in combination, means to hold a web, gripping mechanism, means whereby the gripping mechanism is caused to grip the web and draw the same past the holding means, mechanism to cut the web, and means to operate the holding means whereby the web will be held between the gripping mechanism and the holding means while being cut.

65. In an apparatus of the character described, in combination, a stationary table, means adapted to adhesively assemble a box and a portion of a continuous web on said table, and means adapted to move the attached parts from assembly position and a different portion of the web into assembly position.

66. In an apparatus of the character described, in combination, a stationary table, means adapted to adhesively assemble a box and a portion of a continuous web on said table, and means whereby the movement of one of the attached parts from assembly position feeds a different portion of the web into assembly position.

67. In an apparatus of the character described, in combination, a stationary table, means adapted to adhesively assemble a box and a portion of a continuous web on said table, and means to cause simultaneous movement of the box and web from assembly position, whereby a different portion of the web is disposed in assembly position relatively to the table.

68. In an apparatus of the character described, in combination, a stationary table, means adapted to adhesively assemble a box and a portion of a continuous web on said table, means to cause simultaneous movement of the box and web from assembly position, and mean adapted to vary the extent of the last-mentioned movement.

69. In an apparatus of the character described, in combination, a stationary table, means adapted to adhesively assemble boxes with different portions of a continuous web on said table, means adapted to cause movement of the respective web and attached boxes simultaneously from assembly position, and means adapted to vary the extent of the last-mentioned movements.

70. In an apparatus of the character described, in combination, a stationary table, means adapted to feed a web to said table, means adapted to serially feed boxes to the web and adhesively attach the same thereto in predetermined relation, means adapted to indicate a departure from the predetermined relation of the attached box and web, and means to vary one of the feeding mechanisms to restore the predetermined relation.

71. In an apparatus of the character described, in combination, means adapted to determine the position of an article, means adapted to feed a web to position adjacent the positioning means, said web having a series of marks spaced from each other in the line of feed, means adapted to serially assemble articles in predetermined relation to the marks on the web, and separate means adapted to indicate a departure from said predetermined assembly relation.

72. In an apparatus of the character described, in combination, means adapted to determine the position of a box, means adapted to feed a web to position adjacent the positioning means, said web having a series of marks spaced from each other in the line of feed, means adapted to serially adhesively assemble boxes in predetermined relation to the marks on the web, separate means adapted to indicate a departure from said predetermined assembly relation, and means adapted to restore the predetermined assembly relation.

73. In an apparatus of the character described, in combination, a stationary table, means adapted to feed a continuous web to the table, said web having a series of marks spaced from each other in the line of feed, means adapted to serially adhesively assemble on the table boxes in predetermined relation to the marks on the web, means adapted to move the assembled elements from assembly position thereby feeding a different portion of the web into assembly position, means adapted to indicate a departure from said predetermined assembly relation of the elements, and means adapted to adjust the feed of the web to restore the predetermined assembly relation.

74. In an apparatus of the character described, in combination, means adapted to determine the position of an article, means adapted to feed a web to position adjacent the positioning means, said web having marks thereon spaced in the line of feed, means adapted to serially assemble articles in predetermined relation to the marks on the web, separate means adapted to indicate expansion or contraction of the web, and means adapted to adjust the feed of the web to compensate for the expansion or contraction, whereby the articles will be serially assembled in said predetermined relation.

75. In an apparatus of the character described, in combination, a stationary table, means adapted to adhesively assemble boxes with different portions of a continuous web on said table, reciprocatory means adapted to engage an attached box and cause movement of said box and web simultaneously from assembly position, and means adapted to maintain constant the engaging point of the reciprocatory means relative to the boxes while permitting variation in the amplitude of the stroke of the reciprocatory means.

76. In an apparatus of the character described, in combination, a stationary table, means adapted to adhesively assemble boxes with different portions of a continuous web on said table, reciprocatory means adapted to engage an attached box and cause movement of said box and web simultaneously from assembly position, and means adapted to maintain constant the engaging point of the reciprocatory means relative to the table while permitting variation in the amplitude of the stroke of the reciprocatory means.

77. In an apparatus of the character described, in combination, a stationary table, means adapted to adhesively assemble boxes with different portions of a continuous web on said table, reciprocatory means comprising gripper jaws adapted to grasp an attached box and move the same and its attached web from assembly position, and means adapted to maintain constant the engaging point of the jaws relative to the boxes while permitting variation in the amplitude of the stroke of the reciprocatory means.

78. In an apparatus of the character described, in combination, a stationary table, means adapted to adhesively assemble boxes with different portions of a continuous web on said table, reciprocatory means comprising gripper jaws movable toward and from the assembly position, resilient means to move the jaws toward each other, a pawl to restrain the jaws from movement toward each other, a stop adapted to operate the pawl to permit the jaws to move toward each other to grasp the box, and means adapted to maintain constant the engaging point of the jaws relative to the boxes while permitting variation in the amplitude of the stroke of the reciprocatory means.

79. In an apparatus of the character described, in combination, a stationary table, means adapted to adhesively assemble boxes with different portions of a continuous web on said table, reciprocatory means comprising gripper jaws movable toward and from the assembly position, resilient means to move the jaws toward each other, a pawl to restrain the jaws from movement toward each other, stops located adjacent either end of the path of reciprocation adapted, respectively, to operate the pawl to open the jaws and permit them to close, and means adapted to maintain the engaging point of the jaws relative to the boxes while permitting variation in the amplitude of the stroke of the reciprocatory means.

80. In an apparatus of the character described, in combination, means adapted to supply boxes, a stationary table, means adapted to supply a continuous web to the table, means adapted to adhesively attach in predetermined relation a box of the supply with the web, means adapted to move the attached elements from assembly position and thereby feed the web, means adapted to vary the last-mentioned movement to bring a predetermined portion of the web into similar predetermined assembly position on the table, and means adapted to sever the web.

81. In an apparatus of the character described, in combination, means adapted to supply boxes, a stationary table, means adapted to supply a continuous web to the table, guides adapted to position a box of the supply in predetermined relation on the web on the table, means to adhesively attach the superposed box and web, means adapted to move the attached elements from assembly position and thereby feed the web, means adapted to vary the last-mentioned movement to bring a predetermined portion of the web into similar predetermined assembly position on the table, and means adapted to sever the web.

82. In an apparatus of the character described, in combination, a stationary table, means adapted to supply a continuous web to the table, means adapted to supply boxes comprising a stationary retainer adjacent the table, means adapted to deliver boxes from the retainer and adhesively attach the same in predetermined relation to the web on the table, means adapted to move the attached elements from assembly position and thereby feed the web, and means adapted to sever the web.

83. In an apparatus of the character described, in combination, a stationary table, means adapted to supply a continuous web to the table, means adapted to supply boxes comprising a stationary retainer adjacent the table, means adapted to deliver boxes from the retainer and adhesively attach the same in predetermined relation to the web on the table, means adapted to move the attached elements from assembly position and thereby feed the web, means adapted to vary the last-mentioned movement to bring a predetermined portion of the web into similar predetermined assembly position, and means adapted to sever the web.

84. In an apparatus of the character described, in combination, a stationary table, means adapted to supply a continuous web to the table, means adapted to supply boxes comprising a magazine adapted to contain the boxes, a stationary retainer adjacent the table, means adapted to deliver boxes from the magazine to the retainer, a plunger adapted to deliver boxes from the retainer and press the same against the web on the table in predetermined relation to the web, means whereby the superposed box and web are adhesively attached means adapted to move the attached elements from assembly position and thereby feed the web, means adapted to vary the last-mentioned movement to bring a predetermined portion of the web into similar predetermined assembly position, and means adapted to sever the web.

85. In an apparatus of the character described, in combination, a stationary table, means adapted to supply a continuous web to the table, means adapted to supply boxes comprising a magazine adapted to contain the boxes, a stationary retainer adjacent the table, a reciprocatory box pusher adapted to deliver boxes from the magazine to the retainer, a plunger adapted to deliver boxes from the retainer and press the same against the web on the table in predetermined relation to the web, means whereby the superposed box and web are adhesively attached, means adapted to move the attached elements from assembly position and thereby feed the web, means adapted to vary the last-mentioned movement to bring a predetermined portion of the web into similar predetermined assembly position, and means adapted to sever the web.

86. In an apparatus of the character described, in combination, means adapted to determine the position of the articles, mechanism adapted to feed a web to position adjacent the positioning means, means adapted to sever sections from the web, means adapted to assemble the articles with the sections in predetermined relative position, and means comprising a relatively stationary handle adapted to adjust the feed of the web to compensate for the contraction and expansion thereof.

87. In an apparatus of the character described, in combination, a box supply device, a continuous web supply device, a stationary table, means for pressing and adhesively assembling a box of the supply with the continuous web on the table, means for severing the web to provide a section thereof attached to the box, and means for repeating the aforesaid operations.

88. In an apparatus of the character described, in combination, a box supply device, a continuous web supply device, a stationary table comprising a relatively movable portion, means for adhesively assembling a box of the supply with the continuous web on the table, reciprocatory gripper mechanism comprising jaws adapted to move the attached elements from assembly position, and means adapted to move the movable portion of the table to permit the jaws to grasp the box.

89. In an apparatus of the character described, in combination, a box supply device, a continuous web supply device, a stationary table comprising a relatively movable portion, means for adhesively assembling a box of the supply with the continuous web on the table, reciprocatory gripper mechanism comprising jaws adapted to move the attached elements from assembly position, means adapted to move the movable portion of the table to permit the jaws to grasp the box, and means whereby as the jaws move the box the web is progressively pressed against the box.

90. In an apparatus of the character described, in combination, a box supply device, a continuous web supply device, a stationary table comprising a relatively movable portion, means for adhesively assembling a box of the supply with the continuous web on the table, reciprocatory gripper mechanism comprising jaws adapted to move the attached elements from assembly position, means adapted to move the movable portion of the table to permit the jaws to grasp the box, and means whereby the jaws are bodily tilted relatively to the table as they move the box.

91. In an apparatus of the character described, in combination, a sectional support, a web supply device, a box supply device, means adapted to feed boxes and the web and serially adhesively assemble the boxes with different portions of the web on the support comprising reciprocatory gripper jaws, a web cutter, and means adapted to move a section of the support to permit the jaws to grasp the box.

92. In an apparatus of the character described, in combination, a sectional table, one of the sections comprising a cutter platen, a web supply device, a box supply device, means adapted to feed boxes and the web and serially adhesively assemble the boxes with different portions of the web on the table comprising reciprocatory gripper jaws, a reciprocatory knife adapted to coöperate with the platen to cut the web, and means adapted to move the platen section relatively to the other sections of the table to permit the jaws to grasp the box.

93. In an apparatus of the character described, in combination, a sectional table presenting a plane surface comprising a cutter platen, a web supply device, a box supply device, means adapted to feed boxes and the web and serially adhesively assemble the boxes with different portions of the web on the table, comprising reciprocatory gripper jaws, a reciprocatory knife adapted to move across the platen section to sever the web, and means adapted to depress and raise the platen between the cutting operations of the knife.

94. In an apparatus of the character described, in combination, a table comprising a stationary section and a movable section located side by side, a web supply device, a box supply device, means adapted to feed boxes and the web and serially adhesively assemble the boxes with different portions of the web on the table, a reciprocatory knife adapted to coöperate with the movable section to cut the web, a folding device comprising a relatively stationary wiper adjacent the table, a yoke connected to the movable section and extending around the wiper, and means adapted to reciprocate the yoke.

95. In an apparatus of the character described, in combination, a sectional support, a web supply device, a box supply device, means adapted to feed boxes and the web and serially adhesively assemble the boxes with different portions of the web on the support, comprising reciprocatory gripper jaws having an oscillatory movement at an angle to their path of reciprocation, a web cutter, and means adapted to move a section of the support to permit the jaws to grasp the box and cause the web to be wiped against the box by the edge of the adjacent section of the support.

96. In an apparatus of the character described, in combination, a support comprising a stationary section and a movable cutter platen section, a knife adapted to coöperate with the platen section, a web supply device, a box supply device, means adapted to feed boxes and the web and adhesively assemble the boxes with different portions of the web comprising devices to press the assembled portions against the platen section, reciprocatory gripper jaws, and means adapted to move the platen section out of contact with the assembled elements.

97. In an apparatus of the character described, in combination, means adapted to supply boxes, a stationary table, means adapted to supply a continuous web to the table, guides adapted to position a box of the supply in predetermined relation on the web on the table, means adapted to adhesively attach the superposed box and web, means adapted to move the attached elements from assembly position and thereby feed the web, means adapted to vary the last-mentioned movement to bring a predetermined portion of the web into similar predetermined assembly position on the table, means adapted to sever the web and leave said different portion of the web in assembly position, and means adapted to hold the last-mentioned portion of the web in assembly position.

98. In an apparatus of the character described, in combination, a support, a box supply device, a web supply device, means adapted to feed boxes and the web and serially adhesively assemble the boxes with different portions of the web on the support comprising reciprocatory gripper jaws, means adapted to sever the web, and means adapted to tension the web while being severed.

99. In an apparatus of the character described, in combination, a support, a box supply device, a web supply device, means adapted to feed boxes and the web and serially adhesively assemble the boxes with different portions of the web on the support comprising reciprocatory mechanism adapted to engage the box and draw the web across the support, means adapted to sever the web, and web-holding means adapted to coöperate with the web-feeding means to tension the web during the severing operation.

100. In an apparatus of the character described, in combination, a support, a box supply device, a web supply device, means adapted to feed boxes and the web and serially adhesively assemble the boxes with different portions of the web on the support comprising reciprocatory mechanism adapted to engage the box and draw the web across the support, means adapted to sever the web, and oscillatory web-holding means comprising pivoted fingers and means adapted to press the fingers against the web during the cutting operation.

101. In an apparatus of the character described, in combination, a support, a box supply device, a web supply device, means adapted to feed boxes and the web and serially adhesively assemble the boxes with different portions of the web on the support comprising reciprocatory mechanism adapted to engage the box and draw the web across the support, means adapted to sever the web, oscillatory web-holding means comprising curved web-gripping fingers pivoted at each side of the web, a rock lever, links pivotally connected to the rock lever and each finger, a rock arm, a rod connecting the arm and rock lever, and means to rock said arm to cause the fingers to grip and release the web.

102. In an apparatus of the character described, in combination, a stationary table, a box supply device, a web supply device, means adapted to feed boxes and the web and serially adhesively assemble the boxes with different portions of the web on the table, comprising reciprocatory gripper mechanism, means adapted to sever the web to provide a section attached to each box, means adapted to tension the web during the cutting operation, a press, means adapted to assemble the series of attached boxes and web sections in the press, and means adapted to operate the press to press the attached sections against the boxes.

103. In an apparatus of the character described, in combination, a stationary horizontal table, a box supply device, a web supply device, a vertically movable carrier, a wiper adjacent the path of the carrier, means adapted to feed boxes and the web and serially adhesively assemble the boxes with different portions of the web on the table, comprising reciprocatory gripper mechanism, means adapted sever the web to provide a trailing section attached to each box, means adapted to tension the web during the cutting operation, means whereby the gripper mechanism transfers the assembled elements to the carrier, and means to move the carrier to cause said wiper to fold the trailing section against the box.

104. In an apparatus of the character described, in combination, a stationary horizontal table, a box supply device, a web supply device, a vertically movable carrier, a wiper adjacent the path of the carrier, means adapted to feed boxes and the web and serially adhesively assemble the boxes with different portions of the web on the table, comprising reciprocatory gripper mechanism, means adapted to sever the web to provide a trailing section attached to each box, means adapted to tension the web during the cutting operation, means whereby the gripper mechanism transfers the assembled elements to the carrier, means to move the carrier to cause said wiper to fold the trailing section against the box, a horizontal guideway in alinement with which the attached elements are moved by the carrier, a wiper adjacent the guideway, and means to move the attached elements to cause the last-mentioned wiper to fold the section of web against the box.

105. In an apparatus of the character described, in combination, a stationary horizontal table, a box supply device, a web supply device, a vertically movable carrier, a wiper adjacent the path of the carrier, means adapted to feed boxes and the web and serially adhesively assemble the boxes with different portions of the web on the table, comprising reciprocatory gripper mechanism, means adapted to sever the web to provide a trailing section attached to each box, means adapted to tension the web during the cutting operation, means whereby the gripper mechanism transfers the assembled elements to the carrier, means to move the carrier to cause said wiper to fold the trailing section against the box, a horizontal guideway in alinement with which the attached elements are moved by the carrier, wipers disposed on each side of the guideway, a reciprocatory pusher in alinement with the guideway, and means to operate the pusher to cause the attached elements to pass between the last-mentioned wipers whereby the attached web is smoothed on the box on one side and folded and smoothed on the box on the other side.

106. In an apparatus of the character described, in combination, a stationary table, a carrier comprising clamping jaws, a box supply device, means adapted to feed boxes and serially adhesively assemble the boxes with different portions of a web on the table comprising gripper jaws adapted to grasp the box, means to move the gripping jaws to transfer the attached elements to the jaws of the carrier and draw the web across the table, means to sever the web, and means to cause the carrier jaws to grip the box.

107. In an apparatus of the character described, in combination, a stationary table, a carrier comprising clamping jaws, a box supply device, means adapted to feed boxes and serially adhesively assemble the boxes with different portions of a web on the table comprising gripper jaws adapted to grasp the box, means to intermittently move the gripper jaws to transfer the attached elements to the jaws of the carrier and draw the web across the table, and means to sever the web between the intervals of transfer movement of the jaws.

108. In an apparatus of the character described, in combination, a stationary table, a carrier comprising clamping jaws, a box supply device, means adapted to feed boxes and serially adhesively assemble the boxes with different portions of a web on the table comprising gripper jaws adapted to grasp the box, means to intermittently move the gripper jaws to transfer the attached elements to the jaws of the carrier and draw the web across the table, means to sever the web between the intervals of transfer movement of the jaws, means to open the gripper jaws after the web is severed, and means to cause the carrier jaws to grip the box.

109. In an apparatus of the character described, in combination, a stationary table, a carrier comprising clamping jaws, a box supply device, means adapted to feed boxes and serially adhesively assemble the boxes with different portions of a web on the table comprising box grippers jaws, a relatively movable pawl adapted to open said jaws and permit them to close, means to intermittently move the gripper jaws to transfer the attached elements to the jaws of the carrier and draw the web across the table, means to sever the web between the intervals of transfer movement of the jaws, resilient means in the path of the pawl adapted to open the gripper jaws, and means to cause the carrier jaws to grip the box.

110. In an apparatus of the character described, in combination, a stationary table, a web supply device, means adapted to feed boxes and serially adhesively assemble the boxes with different portions of a web on the table, a carrier comprising relatively movable jaws, means adapted to transfer the attached elements to the jaws of the carrier, and means adapted to relatively move the jaws of the carrier to grip the box to the carrier.

111. In an apparatus of the character described, in combination, a stationary table, a web supply device, means adapted to feed boxes and serially adhesively assemble the boxes with different portions of a web on the table, a carrier comprising relatively movable jaws, means adapted to transfer the attached elements to the jaws of the carrier, means adapted to relatively move the jaws of the carrier to grip the box to the carrier, means to subsequently simultaneously move the jaws of the carrier to move the box, and means to relatively move the jaws of the carrier to release the box after the last-mentioned movement.

112. In an apparatus of the character described, in combination, a stationary table, a web supply device, means adapted to feed boxes and serially adhesively assemble the boxes with different portions of a web on the table, a carrier comprising relatively movable jaws, means adapted to transfer the attached elements to the jaws of the carrier, means adapted to relatively move the jaws of the carrier to grip the box to the carrier, a brush disposed adjacent the path of the carrier, means to simultaneously move the jaws of the carrier to move the box past the brush and cause the latter to press thereagainst, a pair of brushes disposed at an angle to the first-mentioned brush between which the box is adapted to pass, means adapted to relatively move the carrier jaws to release the box when in alinement between the pair of brushes, and means to push the box from the carrier jaws between said pair of brushes.

113. In an apparatus of the character described, in combination, a stationary table, a continuous web supply device, intermittent web feeding means, a web cutting element, an article magazine, article feeding means, and means adapted to cause said elements to coöperate to assemble, on said table, successive articles with successive portions of the web with the web between said table and articles, and successively sever the web so as to provide an article assembled with each web section.

114. In an apparatus of the character described, in combination, a stationary table, a continuous web supply device, intermittent web feeding means, an adhesive supply, a web cutting element, an article magazine, article feeding means, and means adapted to cause said elements to coöperate to adhesively assemble, on said table, successive articles with successive portions of the web with the web between said table and articles, and successively sever the web so as to provide an article assembled with each web section.

115. In an apparatus of the character described, in combination, a stationary table, a continuous web supply device, intermittent web feeding means, an adhesive supply, a web cutting element, an article magazine, article feeding means, and means adapted to cause said elements to coöperate to adhesively assemble, on said table, successive articles with successive portions of the web, and successively sever the web so as to provide an article attached to a portion only of each web section.

116. In an apparatus of the character described, in combination, a stationary table, a continuous web supply device, intermittent web feeding means, an adhesive supply, a web cutting element, an article magazine, article feeding means, and means adapted to cause said elements to coöperate to adhesively assemble, on said table, successive articles with successive portions of the web, and successively sever the web so as to provide an article attached to a portion only of each web section and extending therefrom.

117. In an apparatus of the character described, in combination, a stationary table having a yielding surface, a continuous web supply device, intermittent web feeding means, an adhesive supply, a web cutting element, an article magazine, article feeding means, pressing means, and means adapted to cause said elements to coöperate to adhesively assemble successive articles with successive portions of the web, press the assembled elements on the yielding surface of the table, and successively sever the web so as to provide an article assembled with each web section.

118. In an apparatus of the character described, in combination, a stationary table, a continuous web supply device, intermittent web feeding means, an adhesive supply, a web cutting element, an article magazine, article feeding means, and means adapted to cause said elements to coöperate to adhesively assemble, on said table, successive articles with successive portions of the web, and successively sever the web so as to provide an article assembled with each web section, said cutting element being positioned to sever the web within the edge of the box relative to the position assumed by the box on the table.

119. In an apparatus of the character described, in combination, a stationary table, article guiding and stopping means opposite said table, a continuous web supply device, intermittent web feeding means, an adhesive supply, a web cutting element, an article magazine, article feeding means, and means adapted to cause said elements to coöperate to adhesively assemble, on said table, successive articles with successive portions of the web, and successively sever the web so as to provide an article assembled with each web section, said article feeding means comprising mechanism to feed articles from the magazine to the guiding and stopping means.

120. In an apparatus of the character described, in combination, a stationary table, fixed article guides spaced apart opposite said table, movable box supporting fingers intermediate the guides, a stop plate opposite the space between the guides, a reciprocatory plunger adapted to discharge articles from the fingers to the table, a continuous web supply device, intermittent web feeding means, a web cutting element, an article magazine, article feeding means, an adhesive supply, and means adapted to cause said elements to coöperate to adhesively assemble, on said table, successive articles with successive portions of the web, and successively sever the web so as to provide an article assembled with each web section, said article feeding means comprising mechanism to feed articles from the magazine to the fingers and against the stop opposite the plunger.

121. In an apparatus of the character described, in combination, a stationary table, fixed article guides on said table, a continuous web supply device, intermittent web feeding means, a web cutting element, an article magazine, article feeding means, an adhesive supply, and means adapted to cause said elements to coöperate to adhesively assemble, between the guides on said table, successive articles with successive portions of the web, and successively sever the web so as to provide an article assembled with each web section.

122. In an apparatus of the character described, in combination, a stationary table, a continuous web supply device, intermittent web feeding means, a web cutting element, web holding means, an article magazine, article feeding means, an adhesive supply, and means adapted to cause said elements to coöperate to adhesively assemble, on said table, successive articles with successive portions of the web, successively sever the web so as to provide an article assembled with each web section, and tension the web while being severed.

123. In an apparatus of the character described, in combination, a stationary table, a continuous web supply device, intermittent web feeding means, a web cutting element, web holding means, an article magazine, article feeding means, an adhesive supply, and means adapted to cause said elements to coöperate to adhesively assemble, on said table, successive articles with successive portions of the web, successively sever the web so as to provide an article assembled with each web section, and hold the web on said table.

124. In an apparatus of the character described, in combination, a stationary table, a continuous web supply device, intermittent web feeding means, a web cutting element, web holding means adapted to coöperate with said table, an article magazine, article feeding means, an adhesive supply, and means adapted to cause said elements to coöperate to adhesively assemble, on said table, successive articles with successive portions of the web, and successively sever the web so as to provide an article assembled with each web section, said web holding means comprising fingers and means whereby the fingers are simultaneously moved toward and from the table between the movements of the web.

125. In an apparatus of the character described, in combination, a stationary table, a continuous web supply device, intermittent web feeding means, a web cutting element, web holding means, an article magazine, article feeding means, an adhesive supply, and means adapted to cause said elements to coöperate to adhesively assemble, on said table, successive articles with successive portions of the web, and successively sever the web so as to provide an article assembled with each web section, said web holding means comprising curved narrow fingers disposed longitudinally of the web, and means whereby said fingers are moved toward and from the table to hold and release the web between its feeding movements.

126. In an apparatus of the character described, in combination, a stationary table, a continuous web supply device, intermittent web feeding means, a web cutting element, web holding means adapted to coöperate with said table, an article magazine, article feeding means, an adhesive supply, and means adapted to cause said elements to coöperate to adhesively assemble, on said table, successive articles with successive portions of the web, and successively sever the web so as to provide an article assembled with each web section, said web holding means comprising curved pivoted fingers, a pivoted crosshead, links connected to the fingers and to the crosshead on opposite sides of the pivot of the latter, and means to oscillate the crosshead.

127. In an apparatus of the character described, in combination, a stationary table, a continuous web supply device, intermittent web feeding means, a web cutting element, web holding means adapted to coöperate with said table, an article magazine, article feeding means, an adhesive supply, and means adapted to cause said elements to coöperate to adhesively assemble, on said table, successive articles with successive portions of the web, and successively sever the web so as to provide an article assembled with each web section, said web holding means comprising curved pivoted fingers, a pivoted cross-head, links connected to the fingers and to the cross-head on opposite sides of the pivot of the latter, a rock arm, a link connecting the cross-head and the rock-arm, a rock lever, a rod pivotally connected to the rock arm and to the rock lever, and a cam adapted to oscillate the rock lever.

128. In an apparatus of the character described, in combination, a stationary table, fixed article guides spaced opposite said table, a continuous web supply device, intermittent web feeding means, a web cutting element, a reciprocatory plate adapted to support the cutting element and disposed opposite the space between the guides, an article magazine, article feeding means, an adhesive supply, and means adapted to cause said elements to coöperate to adhesively assemble, on said table, successive articles with successive portions of the web, and successively sever the web so as to provide an article assembled with each web section, a portion of said supporting plate being opposite said guides when articles are delivered to the guides.

129. In an apparatus of the character described, in combination, a stationary table, fixed article guides spaced opposite said table, a continuous web supply device, intermittent web feeding means, a web cutting element, a reciprocatory plate adapted to support the cutting element and disposed opposite the space between the guides, means adapted to reciprocate the supporting plate transversely of the web and cause a dwell at each end of the stroke, an article magazine, article feeding means, an adhesive supply, and means adapted to cause said elements to coöperate to adhesively assemble, on said table, successive articles with successive portions of the web, and successively sever the web so as to provide an article assembled with each web section, a portion of said supporting plate being opposite said guides when articles are delivered to the guides.

130. In an apparatus of the character described, in combination, a stationary table, a continuous web supply device, intermittent web feeding means, a web cutting element, a reciprocatory plate adapted to support the cutting element, a rock lever, a link connecting the plate and lever, a crank, a connecting rod connected to the lever and crank by universal joints, means adapted to intermittently rotate said crank, an article magazine, article feeding means, an adhesive supply, and means adapted to cause said elements to coöperate to adhesively assemble, on said table, successive articles with successive portions of the web, and successively sever the web so as to provide an article assembled with each web section.

131. In an apparatus of the character described, in combination, a stationary table, a continuous web supply device, intermittent web feeding means, a web cutting element, a reciprocatory plate adapted to support the cutting element, a rock lever, a link connecting the plate and lever, a crank, a connecting rod connected to the lever and crank by universal joints, a pinion adapted to rotate the crank, a mutilated gear coöperating with said pinion, means to rotate said mutilated gear, means adapted to intermittently rotate said crank, an article magazine, article feeding means, an adhesive supply, and means adapted to cause said elements to coöperate to adhesively assemble, on said table, successive articles with successive portions of the web, and successively sever the web so as to provide an article assembled with each web section.

132. In an apparatus of the character described, in combination, a stationary table, a continuous web supply device, a web cutting element, an article magazine, article feeding means, an adhesive supply, a reciprocatory gripper, and means adapted to operate said elements to successively adhesively attach an article to the web on the table, cause the gripper to move the attached article and web relatively to the table, thereby feeding the web, and cause the cutting element to sever the web.

133. In an apparatus of the character described, in combination, a stationary table, a continuous web supply device, a web cutting element, an article magazine, article feeding means, an adhesive supply, a reciprocatory gripper, and means adapted to operate said elements to successively adhesively attach an article to the web on the table, cause the gripper to move to the same initial gripping position relative to the table on each stroke and move the attached article and web relatively to the table, thereby feeding the web, and causing the cutting element to sever the web.

134. In an apparatus of the character described, in combination, a stationary table, a continuous web supply device, a web cutting element, an article magazine, article feeding means, an adhesive supply, a reciprocatory gripper, means adapted to operate said elements to successively adhesively attach an article to the web on the table, cause the gripper to move the attached article and web relatively to the table, thereby feeding the web, and cause the cutting element to sever the web, and means adapted to vary the feeding movement of the gripper without varying the initial gripping position.

135. In an apparatus of the character described, in combination, a stationary table, a continuous web supply device, a web cutting element, an article magazine, article feeding means, an adhesive supply, a reciprocatory gripper, and means adapted to operate said elements to successively adhesively attach an article to the web on the table, cause the jaws of the gripper to assume gripping contact with the article while the gripper is at rest and move the attached elements relatively to the table, thereby feeding the web, and the cutting element to sever the web.

136. In an apparatus of the character described, in combination, a stationary table, a continuous web supply device, a web cutting element, an article magazine, article feeding means, an adhesive supply, a reciprocatory gripper, and means adapted to operate said elements to successively adhesively attach an article to the web on the table, cause the jaws of the gripper to assume gripping contact with the attached article while the gripper and the article are relatively stationary and cause the gripper to move the attached article and web relatively to the table, thereby feeding the web, and cause the cutting element to sever the web.

137. In an apparatus of the character described, in combination, a web supply device, an article magazine, means adapted to adhesively assemble an article with the web, means adapted to move the attached elements from assembly position comprising a gripper, mechanism adapted to reciprocate the gripper, and means adapted to vary the amplitude of the reciprocatory movement without varying the relative position of one end of the stroke.

138. In an apparatus of the character described, in combination, a web supply device, an article magazine, means adapted to adhesively assemble an article with the web, means adapted to move the attached elements from assembly position comprising a gripper, an oscillatory lever arm having a constant amplitude of oscillation, and connections between the lever arm and gripper whereby the amplitude of the stroke of the gripper may be varied without varying the relative position of one end of the stroke.

139. In an apparatus of the character described, in combination, a web supply device, an article magazine, means adapted to adhesively assemble an article with the web, means adapted to move the attached elements from assembly position comprising a gripper, an oscillatory lever arm having a constant amplitude of oscillation, a rod pivotally connected to the lever arm and the gripper, and means adapted to vary the effective length of said arm without varying the relative position of one end of the stroke of the gripper.

140. In an apparatus of the character described, in combination, a web supply device, an article magazine, means adapted to adhesively assemble an article with the web, means adapted to move the attached elements from assembly position comprising a gripper, an oscillatory lever arm having a constant amplitude of oscillation, a rod pivotally connected to the gripper, a link pivotally connected to the lever arm and to the rod, and means adapted to rotatably adjust the link around its pivotal axis.

141. In an apparatus of the character described, in combination, a web supply device, an article magazine, means adapted to adhesively assemble an article with the web, means adapted to move the attached elements from assembly position comprising a gripper, an oscillatory lever arm having a constant amplitude of oscillation, a rod pivotally connected to the gripper, a longitudinally adjustable link pivotally connected to the lever arm and to the rod, and means adapted to rotatably adjust the link around its pivotal axis.

142. In an apparatus of the character described, in combination, a web supply device, an article magazine, means adapted to adhesively assemble an article with the web, means adapted to move the attached elements from assembly position comprising a gripper slide having a rectilinear path, a lever, a rotary cam adapted to oscillate said lever in constant amplitude, and connections between said lever and slide whereby the amplitude of the stroke of the gripper may be varied without varying the relative position of one end of the stroke.

143. In an apparatus of the character described, in combination, a web supply device, an article magazine, means adapted to adhesively assemble an article with the web, means adapted to move the attached elements from assembly position comprising a gripper slide having a rectilinear path, a lever, a rotary cam adapted to oscillate said lever in constant amplitude, a link pivoted on the lever, a bar pivoted to the link and adjustably connected to said lever, means to adjust said bar to rotate the link on the lever, and a rod connecting said link and slide.

144. In an apparatus of the character described, in combination, a web supply device, an article magazine, means adapted to adhesively assemble an article with the web, means adapted to move the attached elements from assembly position comprising relatively movable gripper jaws, a relatively movable pawl operatively connecting said jaws, means adapted to reciprocate the jaws, means adapted to vary the amplitude of the reciprocatory movement without varying the relative position of the gripping end of the stroke, a rigid stop adapted to be interposed in the path of the pawl at the gripping end of the stroke, and a resilient stop in the path of the pawl at the releasing end of the stroke.

145. In an apparatus of the character described, in combination, a web supply device, an article magazine, a stationary table, means adapted to adhesively assemble an article with the web on the table, means adapted to move the attached elements from assembly position comprising relatively movable gripper jaws, mechanism adapted to reciprocate the gripper jaws, and means to simultaneously move the jaws to dispose the attached elements at an angle to the surface of the table.

146. In an apparatus of the character described, in combination, a web supply device, an article magazine, means adapted to adhesively assemble an article with the web, means adapted to move the attached elements from assembly position comprising a slide bar, a block pivoted on said bar, a gripper jaw fast to said block, a gripper jaw pivoted on said block, means adapted to reciprocate the slide bar, means adapted to cause the gripper jaws to close on the attached articles at one end of the stroke, and release the same at the other end, and means adapted to simultaneously move the jaws on the pivot of the block as an axis.

147. In an apparatus of the character described, in combination, a stationary table, a source of continuous glued web, an article magazine, means to feed articles from the magazine to the table, a reciprocatory gripper, a web cutting element, a reciprocatory carrier adapted to move in a path intersecting that of the gripper, a wiper adjacent the path of the carrier, and means adapted to cause said elements to coöperate to adhesively assemble, on said table, successive articles with successive portions of the web, successively sever the web so as to provide an article assembled with each web section, transfer the attached articles and sections to the carrier, and fold portions of the sections on the articles at an angle to the first attached portions.

148. In an apparatus of the character described, in combination, a stationary table, a source of continuous glued web, an article magazine, means to feed articles from the magazine to the table, a reciprocatory gripper, a web cutting element, a reciprocatory carrier adapted to move in a path intersecting that of the gripper, a wiper adjacent the path of the carrier, a reciprocatory member adapted to move in a path intersecting that of the carrier, a wiper adjacent the path of said member, and means adapted to cause said elements to coöperate to adhesively assemble, on said table, successive articles with successive portions of the web, successively sever the web so as to provide an article assembled with each web section, transfer the attached articles and sections to the carrier, fold portions of the sections on the articles at an angle to the first attached portions, and deliver the thus attached elements to the operation of said member, whereby another portion of the sections is folded on the articles at an angle to the preceding folded portion.

149. In an apparatus of the character described, in combination, a stationary table, a source of continuous glued web, an article magazine, means to feed articles from the magazine to the table, a reciprocatory gripper, a web cutting element, a reciprocatory carrier adapted to move in a path intersecting that of the gripper, a wiper adjacent the path of the carrier, a reciprocatory member adapted to move in a path intersecting that of the carrier, a wiper adjacent the path of said member, and means adapted to cause said elements to coöperate to adhesively assemble, on said table, successive articles with successive portions of the web, successively sever the web so as to provide an article assembled with each web section, transfer the attached articles and sections to the carrier, and fold portions of the sections on the articles at an angle to the first attached portions and deliver the thus attached elements to the operation of said member, whereby the first attached portion of the sections is smoothed on the articles.

150. In an apparatus of the character described, in combination, a stationary table, a source of continuous glued web, an article magazine, means to feed articles from the magazine to the table, a reciprocatory gripper, a web cutting element, a reciprocatory carrier adapted to move in a path intersecting that of the gripper, a wiper adjacent the path of the carrier, a reciprocatory member adapted to move in a path intersecting that of the carrier, wipers on opposite sides of the path of said member, and means adapted to cause said elements to coöperate to adhesively assemble, on said table, successive articles with successive portions of the web, successively sever the web so as to provide an article assembled with each web section, transfer the attached articles and sections to the carrier, and fold portions of the sections on the articles at an angle to the first attached portions and deliver the thus attached elements to the operation of said member, whereby another portion of the sections is folded on the articles at an angle to the preceding folded portion and a preceding portion smoothed on the article.

151. In an apparatus of the character described, in combination, a stationary table, a continuous web supply device, an article magazine, means to feed articles from the magazine to the table, a reciprocatory gripper, a web cutting element, a carrier, means adapted to cause said elements to successively assemble articles from the magazine with the web on the table, means adapted to cause the gripper to grasp the assembled elements at one end of its stroke, move them to the carrier, and release them adjacent the other end of its stroke, means adapted to cause the gripper to cease moving the assembled elements between the ends of its element moving stroke, and means whereby the cutting element severs the web during said cessation of movement of the gripper.

152. In an apparatus of the character described, in combination, a stationary table, a continuous web supply device, an article magazine, means to feed articles from the magazine to the table, a reciprocatory gripper, a web cutting element, a carrier, means adapted to cause said elements to successively assemble articles from the magazine with the web on the table, means adapted to cause the gripper to grasp the assembled elements at one end of its stroke, move them to the carrier, and release them adjacent the other end of its stroke, means adapted to cause the gripper to cease moving the assembled elements between the ends of its element moving stroke, means whereby the cutting element severs the web during said cessation of movement of the gripper, and means adapted to vary the stroke of the gripper without varying the relative position of the gripping end of its stroke.

153. In an apparatus of the character described, in combination, a stationary table, a continuous web supply device, an article magazine, means to feed articles from the magazine to the table, a reciprocatory gripper, a web cutting element, a carrier, means adapted to cause said elements to successively assemble articles from the magazine with the web on the table, means adapted to cause the gripper to grasp the assembled elements at one end of its stroke, move them to the carrier, and release them adjacent the other end of its stroke, means adapted to cause the gripper to cease moving the assembled elements between the ends of its element moving stroke, means whereby the cutting element severs the web during said cessation of movement of the gripper, and means whereby the web is tensioned while being severed.

154. In an apparatus of the character described, in combination, a stationary table, a continuous web supply device, an article magazine, means to feed articles from the magazine to the table, a reciprocatory gripper, a web cutting element, a carrier, comprising clamp jaws, means adapted to cause said elements to successively assemble articles from the magazine with the web on the table, means adapted to cause the gripper to grasp the assembled elements at one end of its stroke, move them to between the jaws of the carrier, and release them adjacent the other end of its stroke, means adapted to cause the gripper to cease moving the assembled elements between the ends of its element moving stroke, means whereby the cutting element severs the web during said cessation of the movement of the gripper, and means to cause the clamp jaws to grasp the assembled elements released by the gripper.

155. In an apparatus of the character described, in combination, a stationary table, a continuous web supply device, an article magazine, means to feed articles from the magazine to the table, a reciprocatory gripper, a web cutting element, a carrier, comprising clamp jaws movable in a path adapted to intersect that of the gripper, means adapted to cause said elements to successively assemble articles from the magazine with the web on the table, means adapted to cause the gripper to grasp the assembled elements at one end of its stroke, move them to between the jaws of the carrier, and release them adjacent the other end of its stroke, means adapted to cause the gripper to cease moving the assembled elements between the ends of its element moving stroke, means whereby the cutting element severs the web during said cessation of the movement of the gripper, and means to cause the clamp jaws to grasp the assembled elements released by the gripper.

156. In an apparatus of the character described, in combination, a stationary table, a continuous web supply device, an article magazine, means to feed articles from the magazine to the table, a reciprocatory gripper, a web cutting element, a carrier comprising clamp jaws disposed on opposite sides of the path of the gripper, means adapted to cause said elements to successively assemble articles from the magazine with the web on the table, means adapted to cause the gripper to grasp the assembled elements at one end of its stroke, move them to position between the jaws of the carrier and release them adjacent the other end of its stroke, means adapted to cause the gripper to cease moving the assembled elements between the ends of its element moving stroke, means whereby the cutting element severs the web during said cessation of movement of the gripper, and means to move the carrier at an angle to the path of movement of the gripper, comprising mechanism causing the clamp jaws to first grasp the assembled elements and then move them relatively to the table.

157. In an apparatus of the character described, in combination, a stationary table, means adapted to feed a box and adhesively assemble the same with a portion of a continuous web on said table, means adapted to cause simultaneous movement of the box and web so as to move the box from assembly position and a different portion of the web into assembly position relative to the said table, and means adapted to sever said web after said simultaneous movement so as leave said different portion of the continuous web on said table.

158. In an apparatus of the character described, in combination, a stationary table, means adapted to feed a box and adhesively assemble the same with a portion of a continuous web on said table, means adapted to cause simultaneous movement of the box and web so as to move the box from assembly position and a different portion of the web into assembly position relative to said table, and means comprising a cutter mounted to reciprocate transversely of the web and adapted to sever said web after said simultaneous movement so as to leave said different portion of the continuous web on said table.

159. In an apparatus of the character described, in combination, a stationary table, means adapted to feed a box and adhesively assemble the same with a portion of a continuous web on said table, means adapted to cause simultaneous movement of the box and web so as to move the box from assembly position and a different portion of the web into assembly position relative to said table, means comprising a cutter mounted to reciprocate transversely of the web and adapted to sever said web after said simultaneous movement so as to leave said different portion of the continuous web on said table, and means reciprocal with said cutter adapted to arrest the box in alinement with said assembly position on said table.

160. In an apparatus of the character described, in combination, a stationary table, means adapted to feed a box and adhesively assemble the same with a portion of a continuous web on said table, means adapted to cause simultaneous movement of the box and web so as to move the box from assembly position and a different portion of the web into assembly position relative to said table, and means comprising a cutter mounted to reciprocate transversely of the web within the path of feed of the box and adapted to sever said web after said simultaneous movement so as to leave said different portion of the continuous web on said table.

161. In an apparatus of the character described, in combination, a stationary table, means adapted to feed a box and adhesively assemble the same with a portion of a continuous web on said table, means adapted to cause simultaneous movement of the box and web so as to move the box from assembly position and a different portion of the web into assembly position relative to said table, means comprising a cutter mounted to reciprocate transversely of the web within the path of feed of the box and adapted to sever said web after said simultaneous movement so as to leave said different portion of the continuous web on said table, and means adapted to coöperate with said web-moving means to hold the web while being severed.

162. In an apparatus of the character described, in combination, a stationary table, means adapted to feed a box and adhesively assemble the same with a portion of a continuous web on said table, means adapted to cause simultaneous movement of the box and web so as to move the box from assembly position and a different portion of the web into assembly position relative to said table, means comprising a cutter mounted to reciprocate transversely of the web within the path of feed of the box and adapted to sever said web after said simultaneous movement so as to leave said different portion of the continuous web on said table, and reciprocatory fingers adapted to coöperate with said web-moving means to hold the web while being severed.

163. In an apparatus of the character described, in combination, a stationary table having a yielding convex face, means adapted to feed a box and adhesively assemble the same with a portion of a continuous web on said table, means adapted to cause simultaneous movement of the box and web so as to move the box from assembly position and a different portion of the web into assembly position relative to said table, means comprising a cutter mounted to reciprocate transversely of the web and adapted to sever said web after said simultaneous movement so as to leave said different portion of the continuous web on said table, and means reciprocal with said cutter adapted to arrest the box in alinement with said assembly position on said table.

164. In an apparatus of the character described, in combination, a stationary table, means adapted to feed a box and adhesively assemble the same with a portion of a continuous web on said table, means adapted to cause simultaneous movement of the box and web so as to move the box from assembly position and a different portion of the web into assembly position relative to said table comprising a pair of gripper jaws, means to reciprocate said pair of jaws toward and from said table, means adapted to cause said jaws to alternately grip and release the assembled elements, a relatively stationary handle, and connections between said handle and said means to reciprocate said jaws adapted to vary the amplitude of the reciprocatory stroke of said jaws on movement of said handle.

165. In an apparatus of the character described, in combination, means adapted to feed boxes and successively adhesively assemble the same one by one in predetermined relation with successive edges of a web, the construction of the assembly devices being such as to normally obscure direct view of the assembled position of said edges relative to said boxes, means adapted visibly to indicate a departure from said predetermined assembly relation, means adapted to feed said web, means adapted to sever said web to provide said successive edges, and hand-controlled means adapted to vary the feed of said web.

In testimony whereof I affix my signature, in the presence of two witnesses.

ROBINSON BURT.

Witnesses:
HAROLD CARLE,
ARTHUR R. CLARK.

It is hereby certified that in Letters Patent No. 1,174,670, granted March 7, 1916, upon the application of Robinson Burt, of Buffalo, New York, for an improvement in "Labeling-Machines," errors appear in the printed specification requiring correction as follows: Page 4, line 119, for the reference-numeral "120" read *130;* page 13, lines 116–117, claim 51, strike out the words "attached to the box after said last mentioned movement"; same page and claim, line 121, after the word "web" insert the words *attached to the box after said last mentioned movement;* page 14, line 27, claim 53, for the word "strips" read *strip;* page 20, lines 29, 40, 55, claims 110, 111, 112, for the word "web" read *box;* and that the said Letters Patent should be read with these corrections therein that the same may conform to the record of the case in the Patent Office.

Signed and sealed this 18th day of April, A. D., 1916.

[SEAL.]

R. F. WHITEHEAD,
*Acting Commissioner of Patents.*

Cl. 216—22.